US011103886B2

United States Patent
Harvey et al.

(10) Patent No.: US 11,103,886 B2
(45) Date of Patent: Aug. 31, 2021

(54) SPRAYER EQUIPMENT WITH FLUID MIXING SYSTEM

(71) Applicant: Briggs & Stratton, LLC, Wauwatosa, WI (US)

(72) Inventors: Kyle Harvey, Wauwatosa, WI (US); Todd Johnson, Wauwatosa, WI (US); Jeffrey Zeiler, Wauwatosa, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 52 days.

(21) Appl. No.: 16/247,251

(22) Filed: Jan. 14, 2019

(65) Prior Publication Data
US 2019/0217319 A1    Jul. 18, 2019

Related U.S. Application Data

(60) Provisional application No. 62/617,555, filed on Jan. 15, 2018, provisional application No. 62/741,043, filed on Oct. 4, 2018.

(51) Int. Cl.
*B05B 12/16* (2018.01)
*B05B 9/00* (2006.01)
(Continued)

(52) U.S. Cl.
CPC .............. *B05B 12/16* (2018.02); *A01C 17/00* (2013.01); *B05B 7/32* (2013.01); *B05B 9/007* (2013.01);
(Continued)

(58) Field of Classification Search
CPC ....... B05B 12/16; B05B 12/126; B05B 12/12; B05B 12/1436; B05B 12/004;
(Continued)

(56) References Cited

U.S. PATENT DOCUMENTS 5,433,380 A * 7/1995 Hahn ................... A01M 7/0085
 134/169 R
5,904,296 A * 5/1999 Doherty ................ E01H 10/007
 239/61

(Continued)

FOREIGN PATENT DOCUMENTS

WO    PCT/EP2017066611    * 7/2017

OTHER PUBLICATIONS

Raven Precision Applied Technology, "Sidekick Pro Direct Injection," Raven Applied Technology, ravenprecision.com/products/application-controls/sidekick-pro-direct-injection (Mar. 21, 2018).
(Continued)

*Primary Examiner* — Qingzhang Zhou
(74) *Attorney, Agent, or Firm* — Foley & Lardner LLP

(57) ABSTRACT

A sprayer equipment includes a support frame, a pump, a pressure regulator, a concentrate tank, an injector, a spray nozzle, and a controller. The support frame has a plurality of wheels. The pump is coupled to the support frame and includes a pump inlet configured to be fluidly coupled to a water source and a pump outlet providing water at an increased water pressure. The pressure regulator is configured to control the pressure of the water. The concentrate tank is supported by the support frame and configured to store a concentrate fluid. The injector is fluidly coupled to the concentrate tank and configured to inject the concentrate fluid into the water. The spray nozzle is fluidly coupled to the pump outlet and the injector. The controller is coupled to the injector and is configured to control operation of the injector.

21 Claims, 17 Drawing Sheets

(51) Int. Cl.
<table>
<tr><td>B05B 12/02</td><td>(2006.01)</td></tr>
<tr><td>A01C 17/00</td><td>(2006.01)</td></tr>
<tr><td>B05B 12/12</td><td>(2006.01)</td></tr>
<tr><td>B05B 9/06</td><td>(2006.01)</td></tr>
<tr><td>B05B 7/32</td><td>(2006.01)</td></tr>
<tr><td>B05B 12/14</td><td>(2006.01)</td></tr>
<tr><td>B05B 12/00</td><td>(2018.01)</td></tr>
<tr><td>B05B 15/55</td><td>(2018.01)</td></tr>
<tr><td>B05B 1/20</td><td>(2006.01)</td></tr>
<tr><td>B05B 12/04</td><td>(2006.01)</td></tr>
<tr><td>B05B 1/30</td><td>(2006.01)</td></tr>
</table>

(52) U.S. Cl.
CPC .............. B05B 9/06 (2013.01); B05B 12/004 (2013.01); B05B 12/02 (2013.01); B05B 12/12 (2013.01); B05B 12/126 (2013.01); B05B 12/1436 (2013.01); B05B 1/20 (2013.01); B05B 1/3053 (2013.01); B05B 12/04 (2013.01); B05B 15/55 (2018.02)

(58) Field of Classification Search
CPC ........... B05B 12/02; B05B 12/04; B05B 9/06; B05B 9/007; B05B 7/32; B05B 15/55; B05B 1/20; B05B 1/3053; A01C 17/00; A01C 23/04; A01M 7/0092
See application file for complete search history.

(56) References Cited

U.S. PATENT DOCUMENTS

| | | | |
|---|---|---|---|
| 6,886,639 B2* | 5/2005 | Arvidson | A62C 5/02 |
| | | | 137/101.21 |
| 2014/0277781 A1* | 9/2014 | Mangen | A01C 21/00 |
| | | | 700/283 |
| 2017/0082541 A1* | 3/2017 | Posselius | B05B 12/1427 |
| 2019/0060928 A1* | 2/2019 | Gutsmann | B05B 9/08 |

OTHER PUBLICATIONS

Raven Precision, "Sidekick Pro Direct Injection" www.youtube.com/watch?v=Rrd7uS3_PCY dated (Nov. 13, 2017) accessed(Mar. 21, 2018).

* cited by examiner

SPRAYER EQUIPMENT WITH FLUID MIXING SYSTEM

CROSS-REFERENCE TO RELATED PATENT APPLICATIONS

This application claims the benefit of and priority to U.S. Provisional Application No. 62/617,555, filed Jan. 15, 2018, and U.S. Provisional Application No. 62/741,043, filed Oct. 4, 2018, both of which are hereby incorporated by reference herein in their entireties.

BACKGROUND

The present disclosure relates generally to the field of chemical sprayers. More specifically, the disclosure relates to a system for producing a mixed fluid flow in a sprayer system of a chemical sprayer.

Outdoor power equipment includes lawn mowers, riding tractors, snow throwers, fertilizer spreaders and sprayers, salt spreaders and sprayers, chemical spreaders and sprayers, pressure washers, tillers, log splitters, zero-turn radius mowers, walk-behind mowers, wide area walk-behind mowers, riding mowers, stand-on mowers, pavement surface preparation devices, industrial vehicles such as forklifts, utility vehicles, commercial turf equipment such as blowers, vacuums, debris loaders, over-seeders, power rakes, aerators, sod cutters, brush mowers, etc. Outdoor power equipment may, for example use an internal combustion engine to drive an implement, such as a rotary blade of a lawn mower, a pump of a pressure washer, the auger of a snow thrower, the alternator of a generator, and/or a drivetrain of the outdoor power equipment.

SUMMARY

One embodiment of the present invention relates to sprayer equipment. The sprayer equipment includes a support frame, a pump, a pressure regulator, a concentrate tank, an injector, a spray nozzle, and a controller. The support frame has a plurality of wheels. The pump is coupled to the support frame and includes a pump inlet configured to be fluidly coupled to a water source and a pump outlet providing water at an increased water pressure. The pressure regulator is configured to control the pressure of the water. The concentrate tank is supported by the support frame and configured to store a concentrate fluid. The injector is fluidly coupled to the concentrate tank and configured to inject the concentrate fluid into the water. The spray nozzle is fluidly coupled to the pump outlet and the injector. The controller is coupled to the injector and is configured to control operation of the injector.

Another embodiment of the invention relates to a spraying system. The spraying system includes a pump, a pressure regulator, a concentrate tank, and a controller. The pump includes a pump inlet configured to be fluidly coupled to a water source and a pump outlet providing water at an increased water pressure. The pressure regulator is configured to control the pressure of the water. The concentrate tank is configured to store a concentrate fluid. The injector is fluidly coupled to the concentrate tank and is configured to inject the concentrate fluid into the water downstream of the pressure regulator resulting in a combined fluid. The spray nozzle is fluidly coupled to the pump outlet and the injector and is configured to spray the combined fluid. The controller is coupled to the injector and is configured to control operation of the injector.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
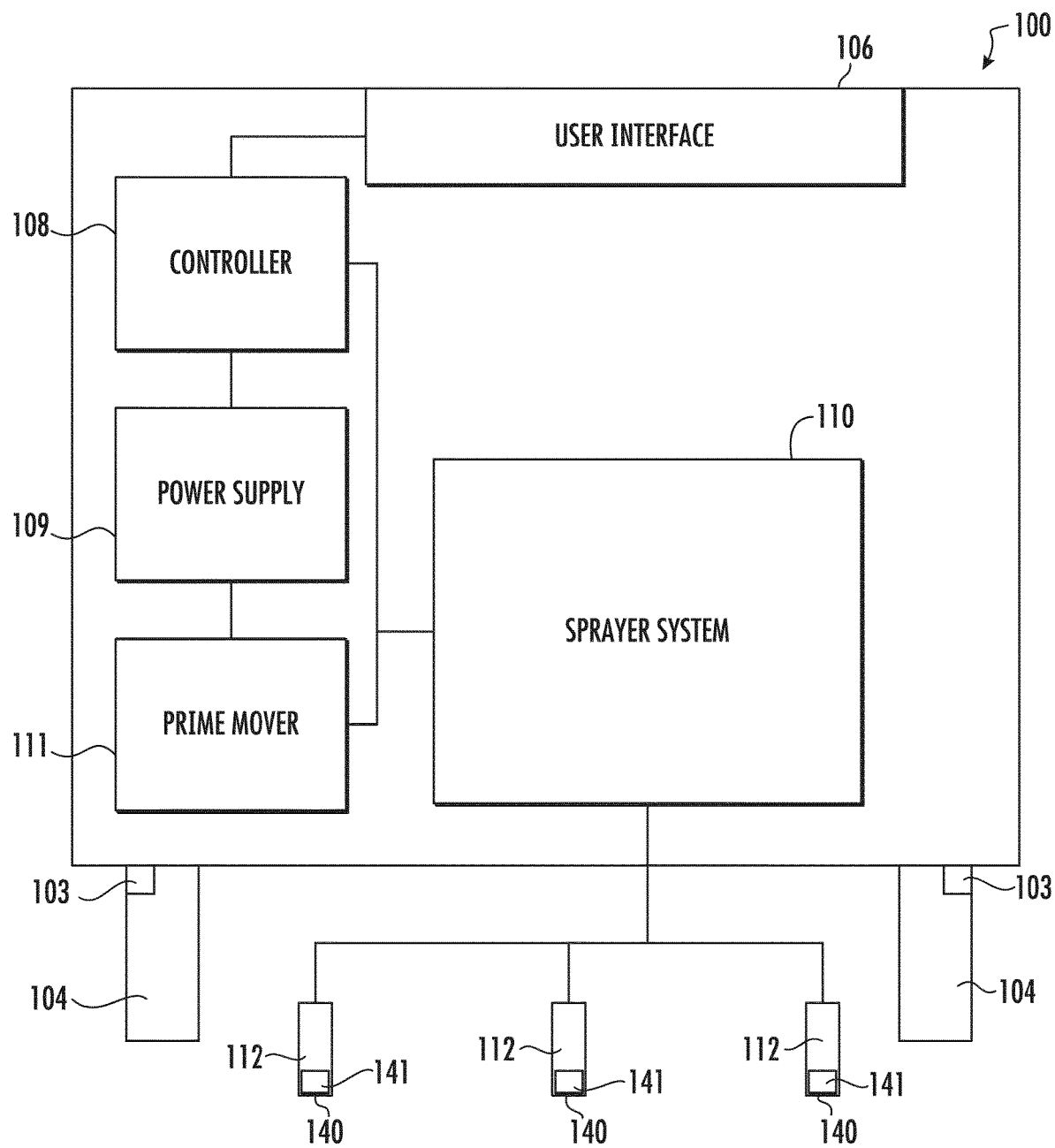
FIG. 1 is a front schematic view of a sprayer equipment, according to an exemplary embodiment.
Figure 2:
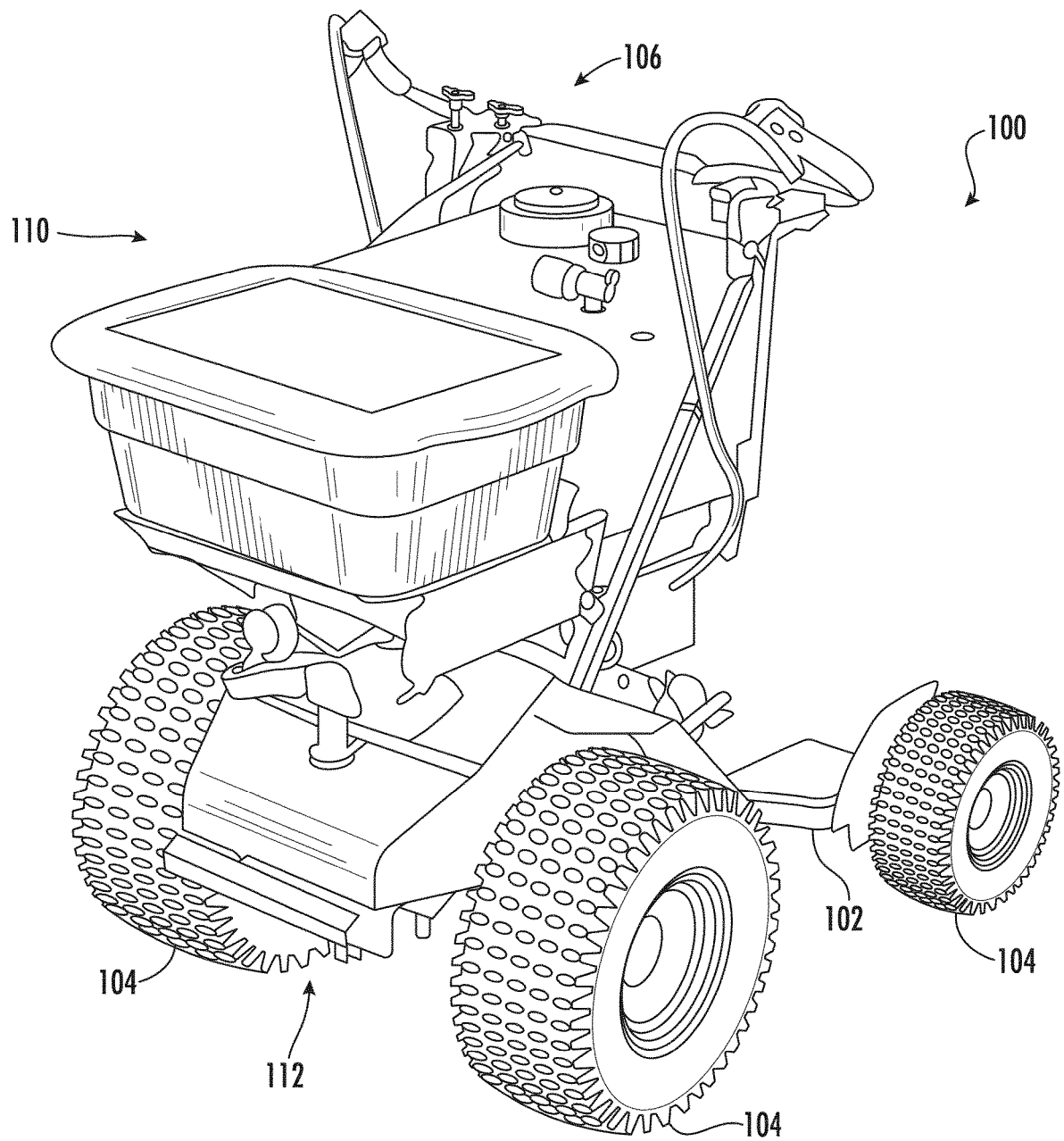
FIG. 2 is a front perspective view of a sprayer equipment.
Figure 3:
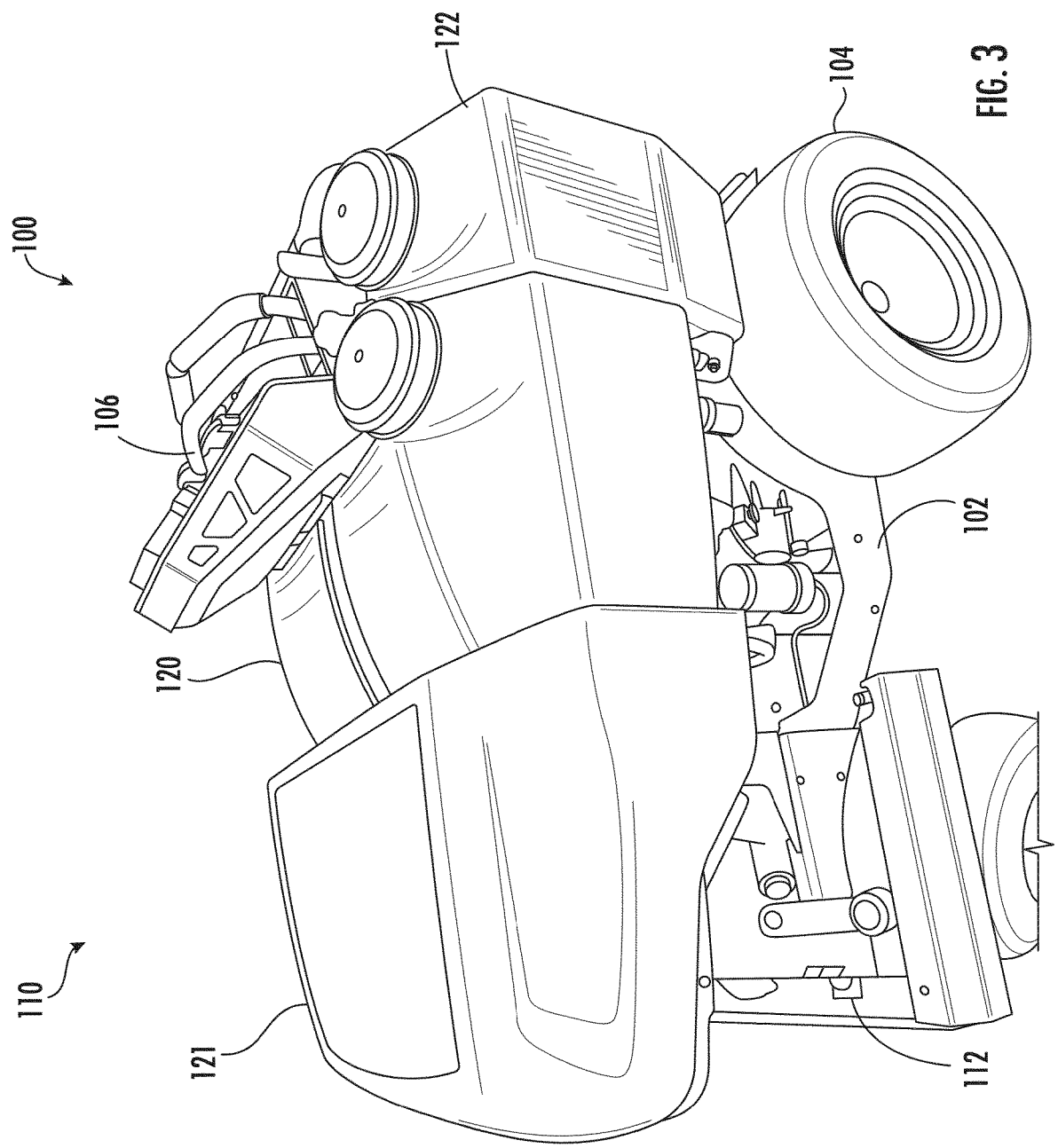
FIG. 3 is a side perspective view of a sprayer equipment.
Figure 4:
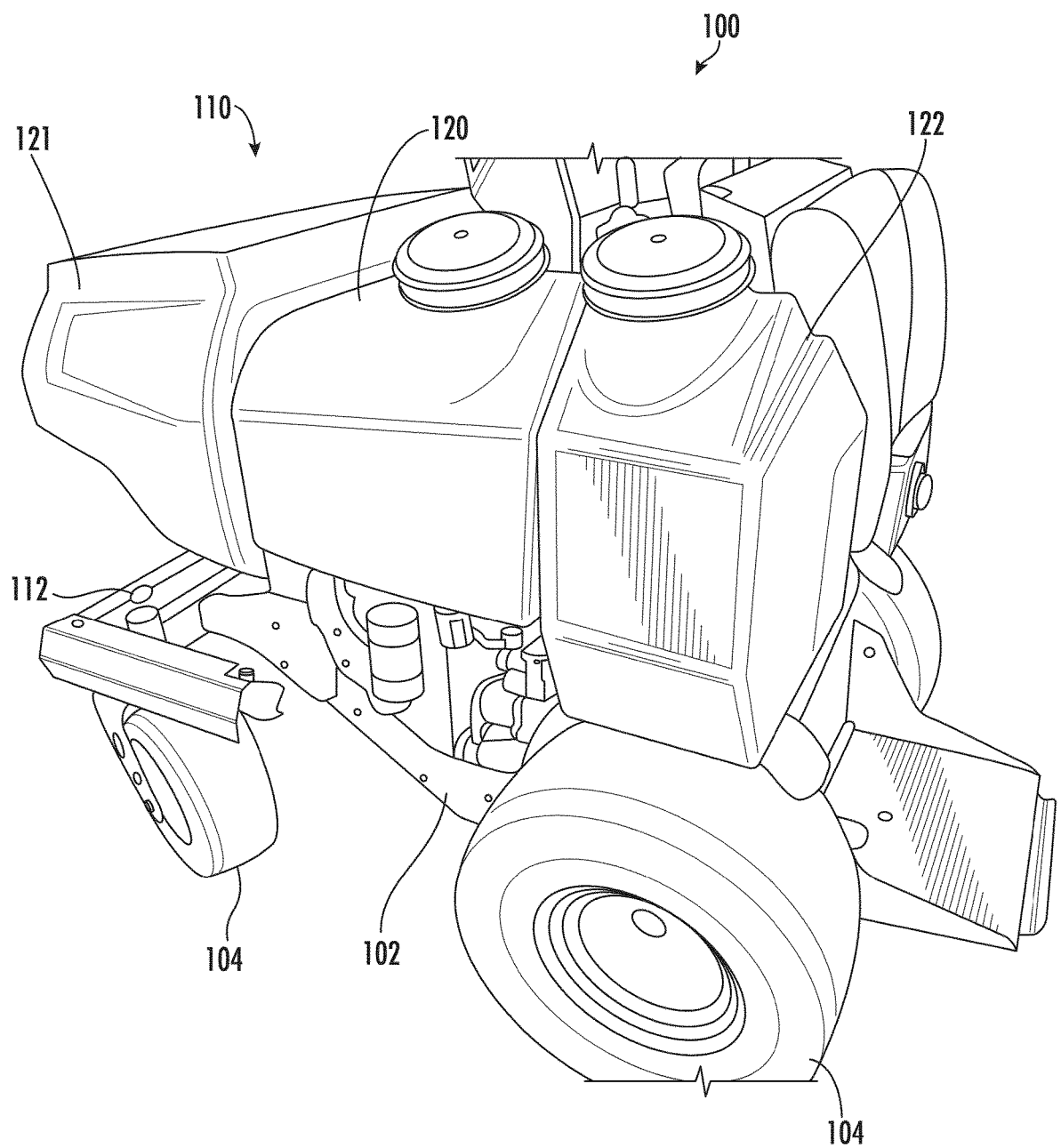
FIG. 4 is a rear perspective view of a sprayer equipment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to FIGS. 1-4, according to an exemplary embodiment, a sprayer equipment 100 is shown. In some embodiments, sprayer equipment 100 may be in the form of a turf sprayer, a grass sprayer, a spreader/sprayer, a ride-on sprayer/spreader, etc. The sprayer equipment 100 includes a support frame 102 having wheels 104, a user interface 106, a controller 108, a power supply 109, a sprayer system 110, and one or more spray nozzles 112. The support frame 102 also supports a prime mover 111, such as an internal combustion engine or an electric motor, and a pump 114. The pump 114 is coupled to the prime mover 111 to be driven by the prime mover. In some embodiments, a wheel speed sensor 103 is coupled to each wheel 104 to sense speed and direction values of each wheel 104. Wheel speed sensors 103 may detect the speed and direction of each wheel 104 to determine if sprayer equipment 100 is turning, and if so the radius of the turn based on the differences in speed and direction of each of the two wheels 104. In other embodiments, the wheel speed sensor 103 is coupled to or incorporated with the motor driving the wheels 104. In some embodiments, two of the wheels 104 are each driven by a motor (e.g., an electric motor, a hydraulic motor, a hydraulic transaxle, etc.) and two of the wheels 104 are free-wheeling and not driven by a motor. The components of the sprayer equipment 100 are supported by the support frame 102 of the sprayer equipment 100. In some embodiments, the support frame 102 may include a suspension system to help absorb the liquid weight movement and displacement within primary tank 120 and concentrate tank 122. The sprayer equipment 100 is maneuverable by an operator (e.g., using the user interface 106) and as such, also includes a platform or seating area for the operator to stand or sit while operating the device 100.

Referring to FIGS. 5-10, the sprayer system 110 includes a pump 114 and a pressure regulator 116 fluidly coupled to a primary tank 120. The primary tank 120 acts as a water source for the sprayer equipment 100. In some embodiments, the primary tank 120 is configured to hold 31 gallons of water. A water flow conduit or hose 132, forming a water flow path 130, fluidly couples the primary tank 120 to the pump 114 and pressure regulator 116. The sprayer system 110 also includes a concentrate tank 122. In some embodiments, sprayer system 110 may comprise a plurality of concentrate tanks 122. In the embodiment shown in FIGS. 3-4, there is one concentrate tank 122, but in still other embodiments there may be any number of concentrate tanks 122. The concentrate tank 122 stores various types of concentrate (e.g., fertilizer, weed killer, insecticide, herbicide, etc.) intended for injection into the water flow path 130 of the sprayer equipment 100. In some embodiments, the concentrate tank 122 is configured to hold 6 gallons of concentrate. In some embodiments, the primary tank 120 and the concentrate tank 122 each comprise an opening, configured for a user to fill up the primary tank 120 with water and the concentrate tank 122 with a selected concentrate. In some embodiments, the openings on the primary tank 120 and the concentrate tank 122 are on the same side of the sprayer equipment 100, to allow for ease of filling up the sprayer equipment 100. In some embodiments, the primary tank 120 and/or concentrate tank 122 may be removable, such that they can be filled separate from the sprayer equipment 100 and then returned to their positions once filled. In some embodiments, the hopper 121 may be replaced by an additional concentrate tank 122 or primary tank 120, positioned on the front of the device, providing for additional storage of water and/or chemicals.

The concentrate tank 122 is fluidly coupled to an injector 118 via concentrate conduit or hoses 134. Each concentrate tank 122 is coupled to the injector 118 through separate concentrate conduit 134. In some embodiments, if there are multiple concentrate tanks 122, each concentrate tank 122 may have a separate concentrate conduit 134, which join into a central concentrate conduit 136, which is fluidly coupled to the injector 118. In some embodiments, one injector 118 is used for multiple concentrate tanks 122. In other embodiments, multiple injectors 118 are included, one for each concentrate tank 122. As described further herein, each injector 118 is controlled separately by the controller 108 to start/stop injection of concentrate, control the timing, duration, and cycling of injection events, and control the amount of concentrate per injection pulse. In some embodiments, the concentrate tank 122 is removable and replaceable such that an operator may exchange the concentrate tank 122 for replenishment of concentrate and/or to change the type of concentrate being used. In some embodiments, if there are multiple concentrate tanks 122, the device 100 may provide between the concentrate tanks 122 such that the type of concentrate used may be changed during operation (e.g., by user interface).

In operation, water from the primary tank 120 is pumped into the water flow path 130 by the pump 114 and through the pressure regulator 116. Concentrate from the concentrate tanks 122 is injected by the injector 118 into the water flow path 130 flowing from the pressure regulator 116 to form a combined fluid in the combined flow path 138 downstream of the injector 118. Water or combined fluid, including water and concentrate, exits the sprayer equipment 100 via spray nozzles 112. In some instances, concentrate is not injected into the flow path 138 such that only water exits through the spray nozzles 112.

Figure 5:
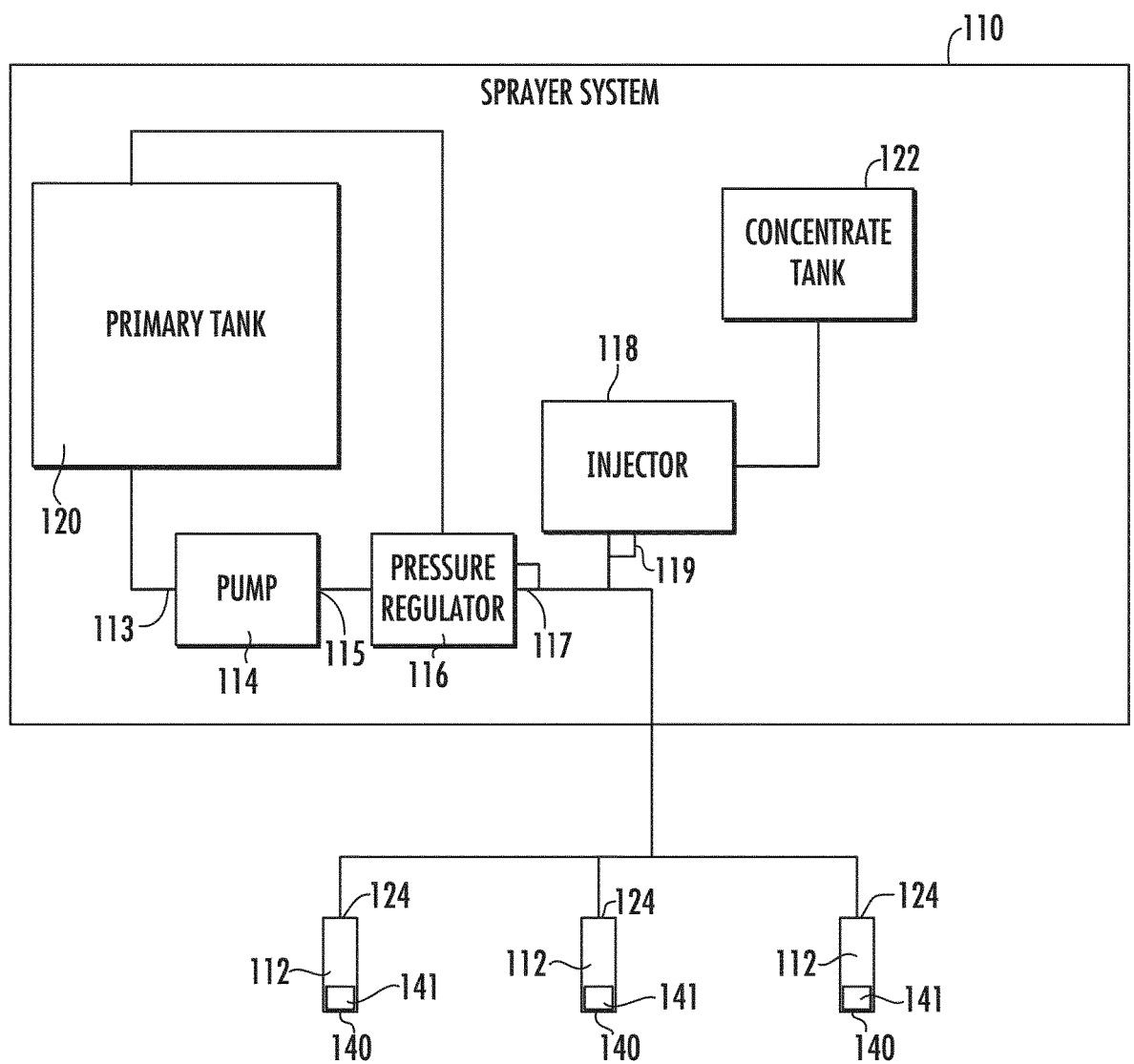
FIG. 5 is a schematic diagram of a sprayer system of the sprayer equipment of FIG. 1, according to an exemplary embodiment.
Figure 6:
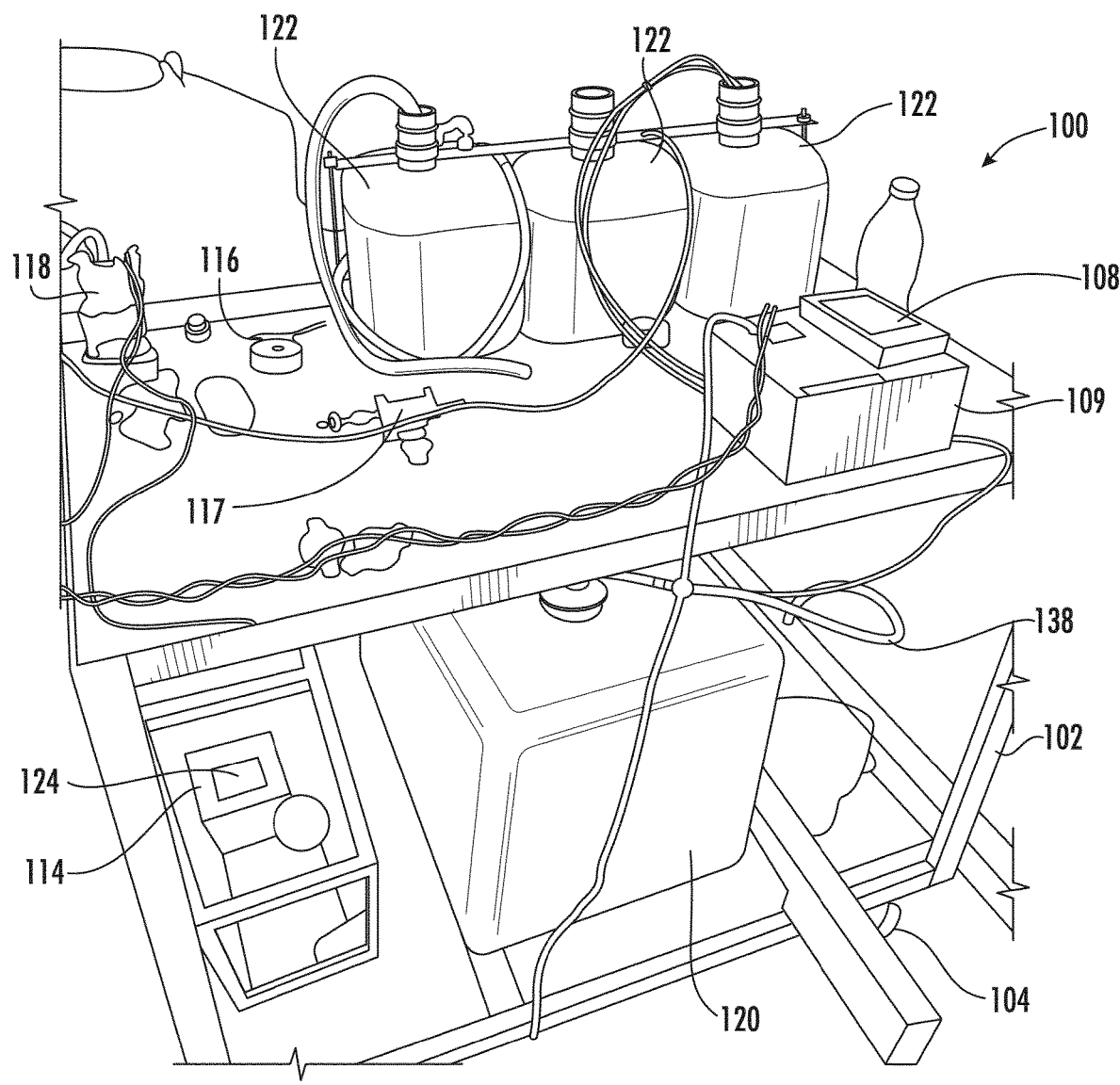
FIG. 6 is a side perspective view of the sprayer equipment of FIG. 1, according to an exemplary embodiment.

Referring to FIGS. 5-6, the pump 114 is shown, according to some embodiments. In one embodiment, the pump 114 is a positive displacement pump, driven by a motor 124. The pump 114 includes a pump inlet 113 and a pump outlet 115. Water flowing from the primary tank 120 flows into the pump 114 at the pump inlet 113 and exits the pump 114 at the pump outlet 115. The pump 114 is configured to pressurize the water flow, such as by converting the reciprocating action of a diaphragm to an increased static pressure of the water flow and, in turn, increasing a related pressure and a flow velocity with which the water or combined flow exits the sprayer equipment 100. While the pump 114 is described as a reciprocating-type positive displacement pump, other embodiments utilize other styles of pumps, including centrifugal-type pumps and/or rotary-type positive displacement pumps.

In some embodiments, the sprayer system 110 includes a flow sensor 117. The flow sensor 117 measures, detects, monitors, evaluates, and/or is affected by characteristics (e.g., flow rate) of the water flow through the sprayer system 110, and thus provides the sensor a status based upon the flow characteristics of the liquid. For example, in the system 110, the sensor 117 is coupled to the pump 114 proximate to the pump outlet 115 to detect a flow rate of water out of the pump 114. The sensed values from the flow sensor 117 may be communicated to the controller 108 (e.g., pressure regulator control circuit 328, input/output circuit 332) for controlling various components of the sprayer equipment 100.

Pressurized water flow exits from the pump 114 through the pump outlet 115 and into the water flow path 130. The water flows along water flow path 130 and enters the pressure regulator 116. The pressure regulator 116 includes a flow restrictor providing variable restriction to the fluid flow through the pressure regulator 116. The pressure regulator 116 responds to manual control from the operator (via the user interface). In some embodiments, the pressure regulator 116 is configured to respond to signals from the controller 108 as described further herein to maintain or adjust a desired downstream flow rate and pressure of fluid flow through the system 110. In other embodiments, the pressure regulator 116 may automatically adjust the flow rate and pressure of fluid flow through the system 110 based on signals received via the pressure regulator control circuit 328.

Figure 11:
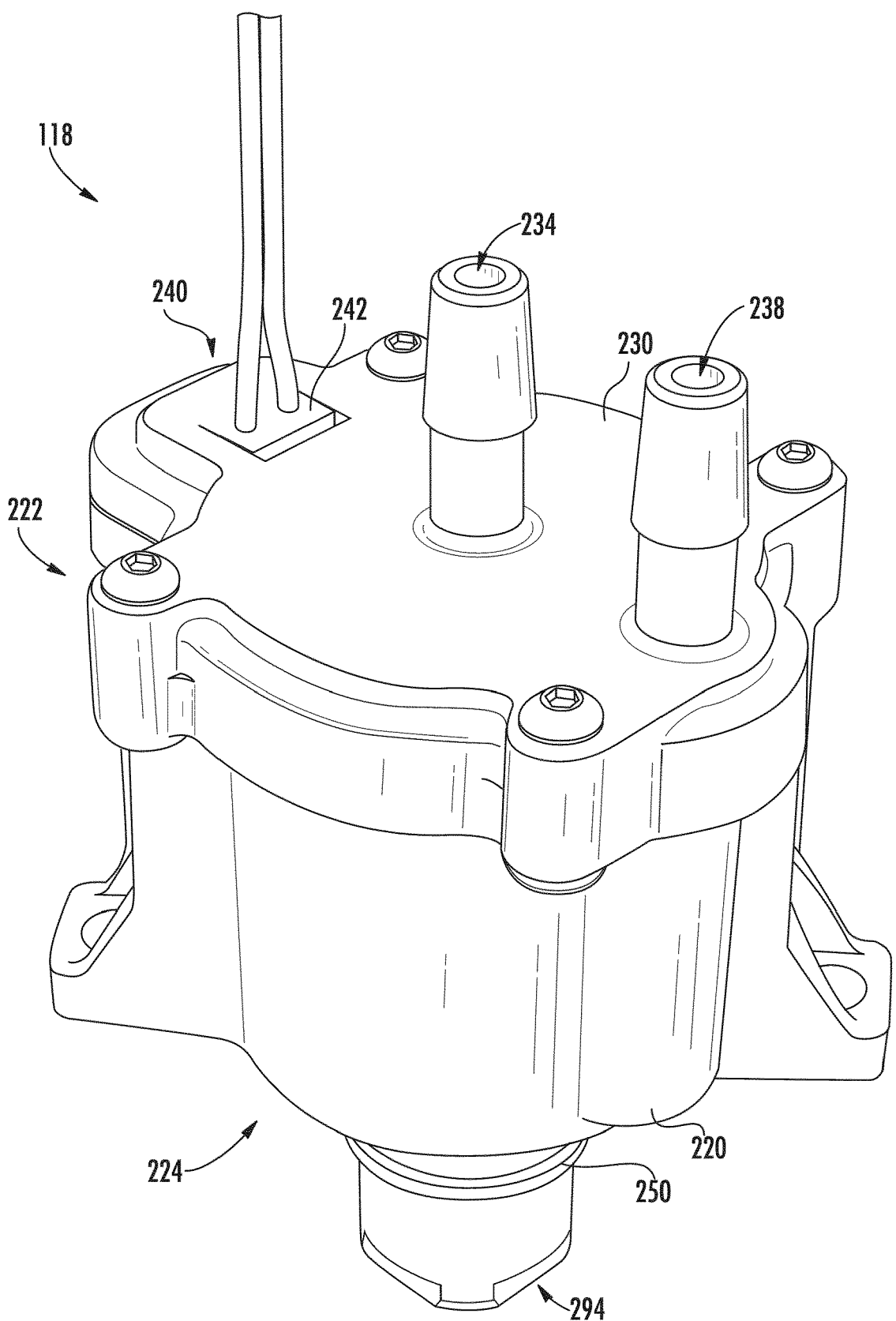
FIG. 11 is a perspective view of an injector of the sprayer equipment of FIG. 1, according to an exemplary embodiment.
Figure 12:
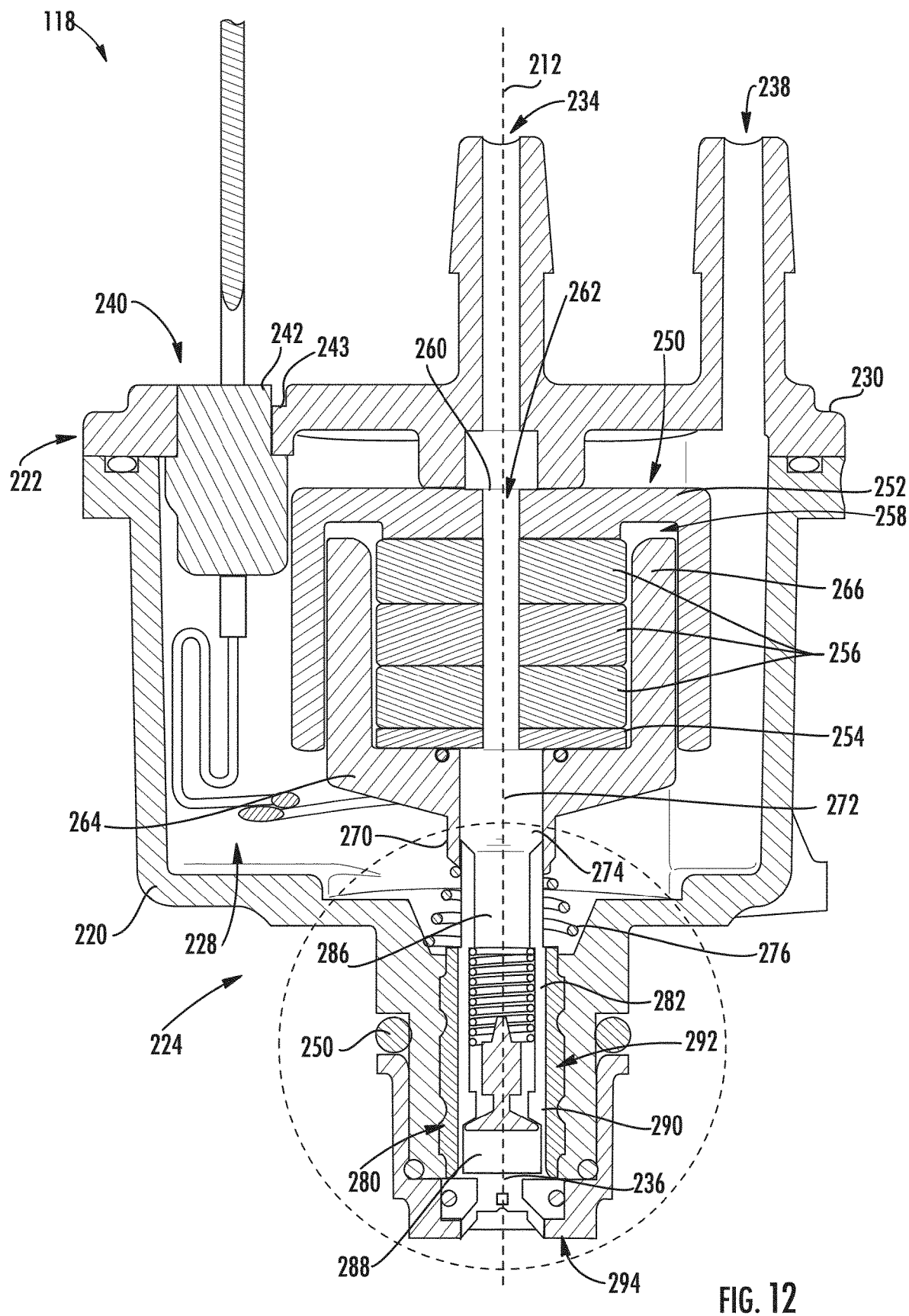
FIG. 12 is a section view of the injector of FIG. 6, according to an exemplary embodiment.

Referring to FIG. 11, the injector 118 includes a housing 220, an end cap 230, a magnetic assembly 250, a pumping assembly 280, an invalve assembly 292, and an outvalve assembly 294, according to some embodiments. As shown in FIG. 12, the housing 220 defines a central, longitudinal axis, shown as central axis 212. As shown in FIG. 11-12, the housing 220 has a first end, shown as upper portion 222, and an opposing second end (e.g., neck, etc.), shown as lower portion 224. As shown in FIGS. 11-12, the end cap 230 is coupled to the upper portion 222 of the housing 220. The injector 118 also includes a sealing member 250 to seal the injector 118 to its operative location. In some embodiments, an injector 118 is positioned within each concentration tank 122. In this embodiment, each injector is integrally formed with a concentration tank 122. In other embodiments, other types of injectors can be used.

As shown in FIG. 11-12, the injector 118 includes a power assembly, shown as electrical assembly 240, used to provide electricity to the coil 266. The electrical assembly 240 includes an interface, shown as electrical connector 242, integrally formed with the end cap 230. In one embodiment, the electrical connector 242 is a female connector configured to receive a male connector. In other embodiments, the electrical connector 242 is a male connector. The electrical connector 242 may function as a quick-connect connector configured to electrically couple the injector 118 to the power supply 109 and the controller 108.

In some embodiments, an injector sensor 119 is included with each injector 118. The injector sensor 119 measures, detects, monitors, evaluates, and/or is affected by characteristics (e.g., flow rate) of the concentrate injected by the injector 118. For example, the injector sensor 119 is coupled to each injector 118 proximate to an outlet of each injector 118 to detect flow characteristics of fluid out of the injector 118 (e.g., flow rate). The sensed values from the injector sensor 119 may be communicated to the controller 108 (e.g., injector control circuit 322, input/output circuit 332) for controlling various components of the sprayer equipment 100.

In operation, the injector 118 receives liquid concentrate from the concentrate tanks 122 (e.g., via central concentrate conduit 136) through the inlet conduit 234, which may then flow through the fluid conduit 262 of the pin 260, into the fluid conduit 272 of the stem 270 of the bobbin 264, and into at least one of (i) the cavity 228 through the holes 274, (ii) into the inlet chamber 286 of the pumping assembly 280, and (iii) into the outlet chamber 288 of the pumping assembly 280 through the invalve assembly 292 (e.g., until the injector 118 is full or saturated).

An injection event of the injector 118 may operate as follows. At the start of an injection event, the bobbin 264 is biased by the return spring 276 to a first position against the bottom plate 254. The coil 266 receives an electrical current, which interacts with the magnetic field of the top plate 252, the bottom plate 254, and/or the intermediate plates 256 in the recess 258. Such interaction may cause a downward force on the coil 266, to thereby drive the bobbin 264 to a second position, driving a stroke of the piston 290 within the sleeve 282 (e.g., a down-stroke, etc.). After a first portion of the stroke of the piston 290, the pressure within the outlet chamber 288 exceeds a first target pressure which thereby causes the invalve assembly 292 to close.

After the first portion of the stroke of the piston 290, a second portion of the stroke begins. During the second portion of the stroke of the piston 290, the pressure within the outlet chamber 288 increases rapidly, causing the differential pressure across the check ball 236 to overcome the biasing force of a spring to allow the liquid within the outlet chamber 288 to flow through the through-hole of the seat assembly (e.g., the pressure within the outlet chamber 288 exceeds a second target pressure that causes the spring to compress). According to an exemplary embodiment, the spring is configured to bias the check ball 236 against an inlet of the through-hole to prevent liquid from flowing therethrough. The liquid is then atomized by orifices of an orifice plate and injected (e.g., sprayed) into a desired location (e.g., into water flow path 130 shown in FIG. 2). At the end of the injection event, the coil 266 stops receiving the electrical current that allows the piston spring 276 to return the bobbin 264 back to the first position, thereby retracting the piston 290 within the sleeve (e.g., an up-stroke, etc.) causing the invalve assembly 292 to reopen and the seat assembly to close. During this return stroke of the piston 290, the chamber 288 refills with liquid concentrate. The duration of the injection relates to the stroke length of the pumping assembly 280 (e.g., the distance traveled by the piston 290 during the injection event). A longer stroke length provides a larger volume of concentrate within the chamber 288 that is expelled during the injection event and a shorter stroke length provides a smaller volume of concentrate within the chamber 288 that is expelled during the injection event. The volume of concentrate expelled during the injection event of a particular injector 118 can therefore be modified by changing the spring rate or constant of the outvalve spring, which controls the first or home position of the pumping assembly 280. The injection characteristics can also be changed by changing the number and size of the orifice holes.

Figure 7:
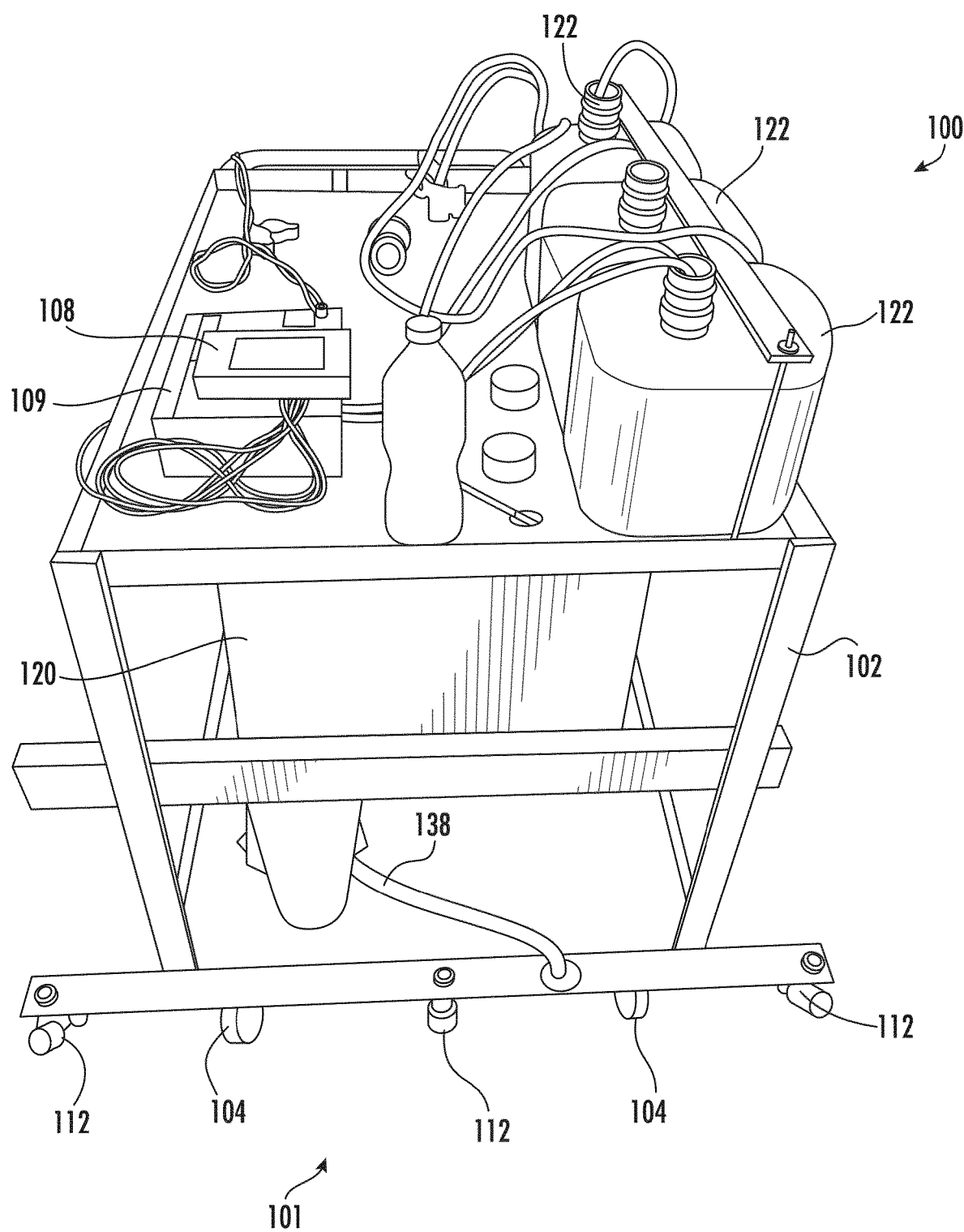
FIG. 7 is a front perspective view of the sprayer equipment of FIG. 1, according to an exemplary embodiment.
Figure 8:
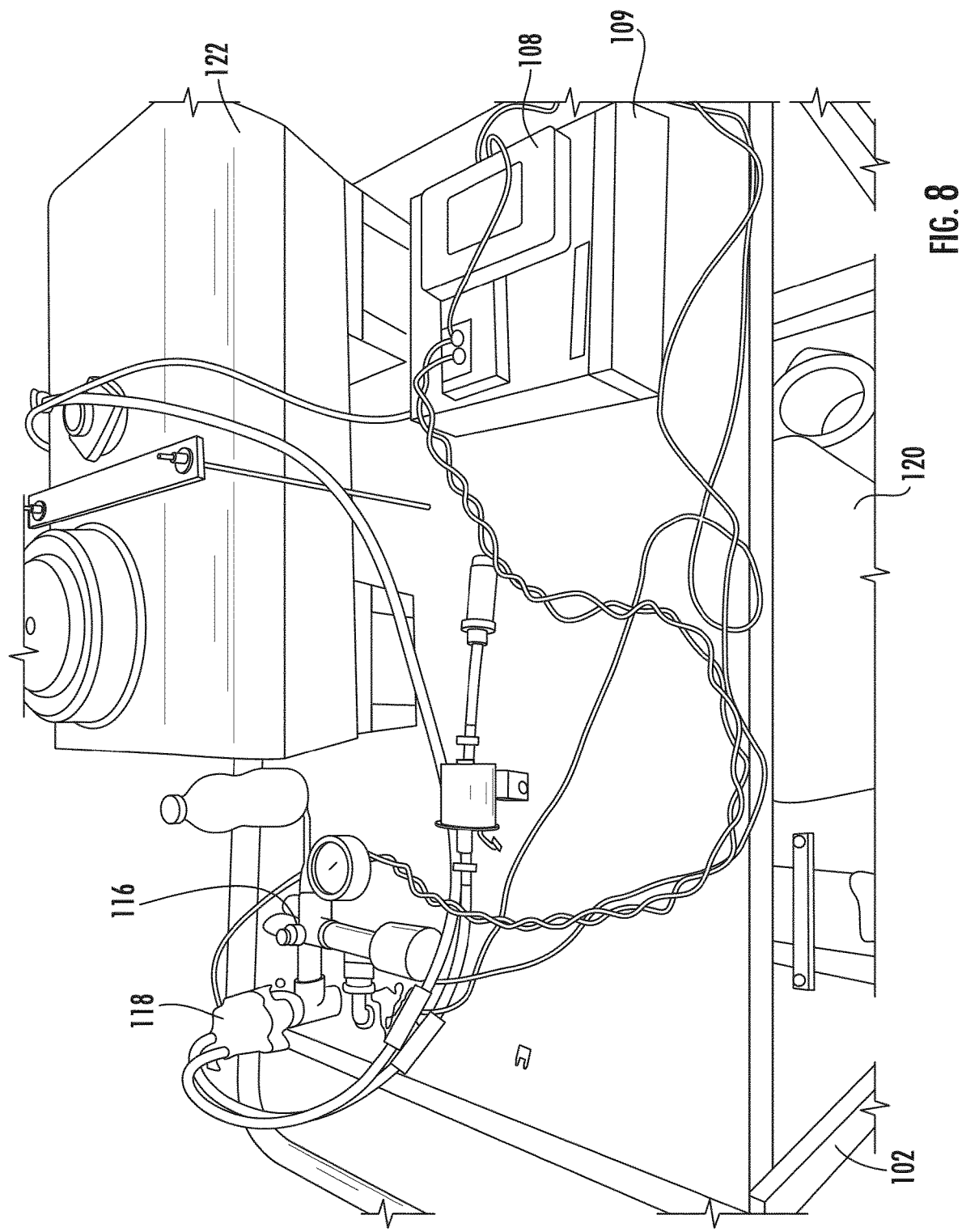
FIG. 8 is a side perspective view of the sprayer equipment of FIG. 1, showing one concentrate tank.
Figure 9:
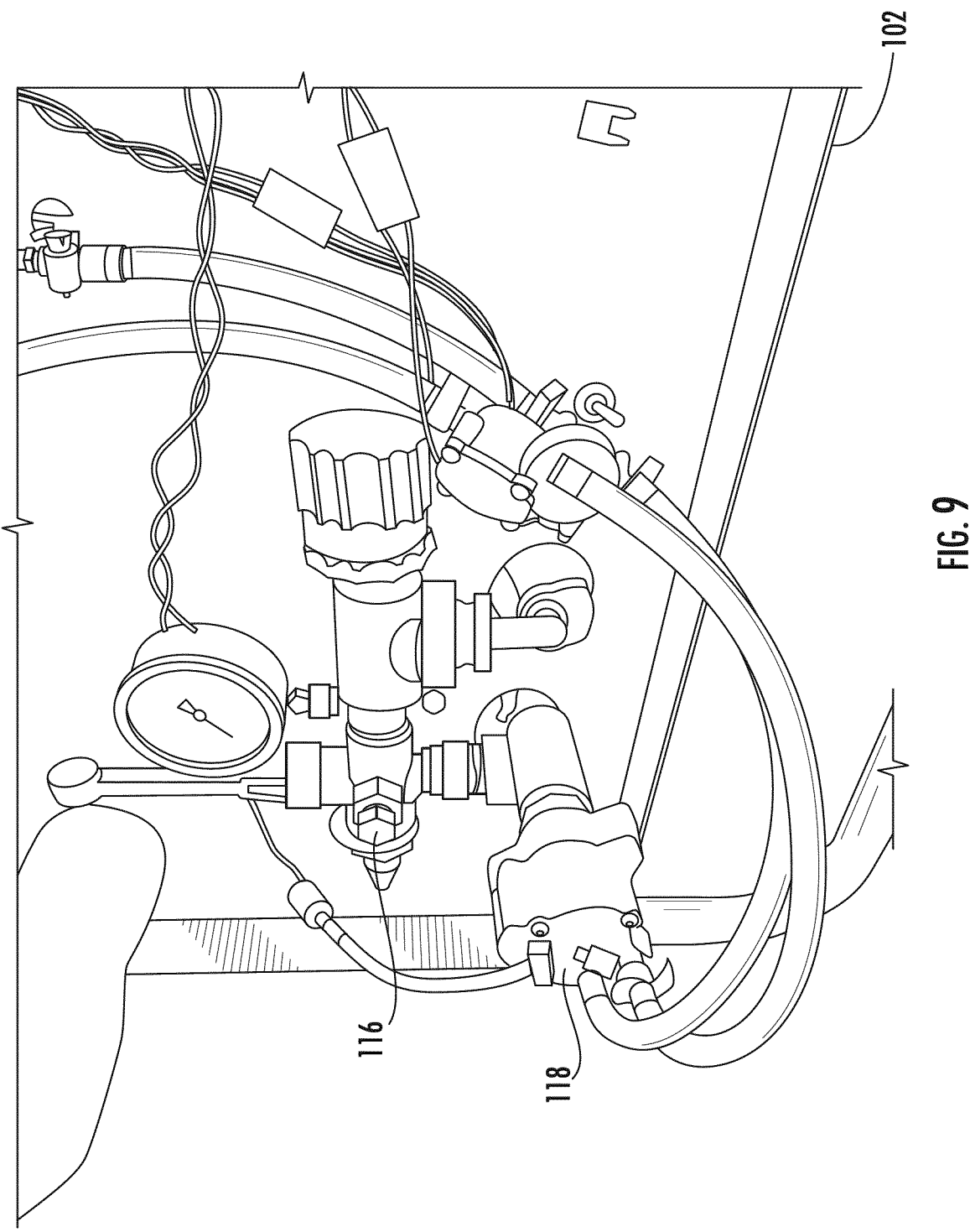
FIG. 9 is a perspective view of a pressure regulator and injector of the sprayer equipment of FIG. 1, according to an exemplary embodiment.
Figure 10:
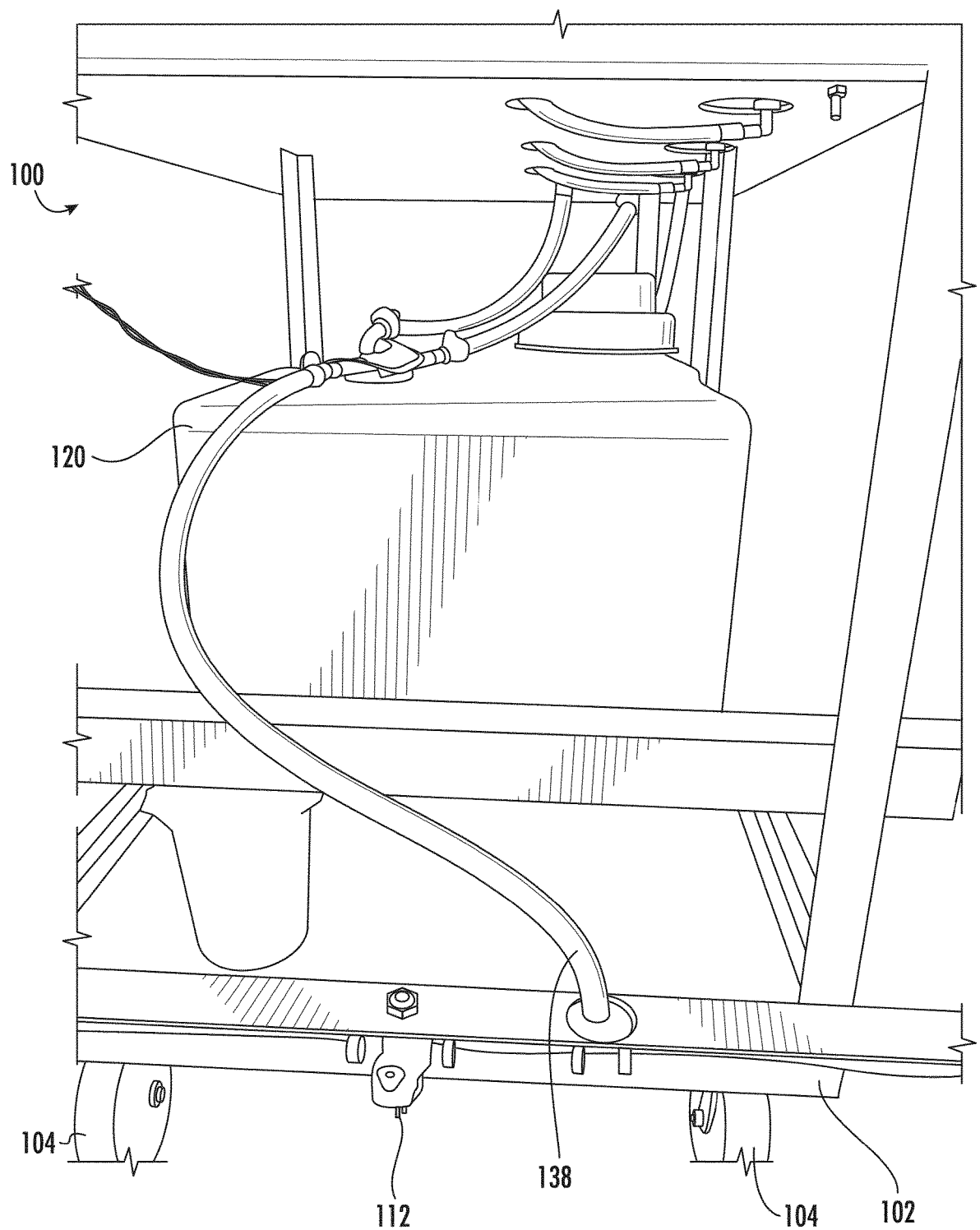
FIG. 10 is a front view of a portion of the sprayer equipment of FIG. 1, according to an exemplary embodiment.

As shown in FIGS. 1, 7, 10, and 16, the sprayer equipment 100 further includes one or more spray nozzles 112. The spray nozzles 112 are coupled to the support frame 102 of the sprayer equipment 100 as shown in FIGS. 1 and 7 (e.g., front side 101 of the sprayer equipment 110 proximate the front wheels 104). The spray nozzles 112 are fluidly coupled to the components of the sprayer system 110 through a combined flow path 138. In various configurations, the spray nozzles 112 receive water or combined fluid (e.g., water and concentrate) from primary tank 120 and/or concentrate tanks 122 and dispense the water or combined fluid through an outlet 140 of each spray nozzle 112. The spray nozzles 112 can be rotatable individually or as a unit. The outlet 140 of each spray nozzle 112 can be variable and adjustable in nature. According to some embodiments, the spray nozzles 112 include rotatable heads, which may include a plurality of patterned openings of different sizes and/or shapes. Accordingly, the water flow and/or combined flow may exit through a variety of openings of differently-shaped patterns with different cross-sectional areas.

In the embodiment shown, the spray nozzles 112 are controlled by solenoids 124. The solenoids 124 are coupled to the spray nozzles 112 to selectively open and close the spray nozzles 112 to allow or stop the release of the water or combined fluid through the outlets 140 of the spray nozzles 112. In some embodiments, the solenoids 124 may be opened and closed automatically via the solenoid control circuit 334. In some embodiments, solenoids 124 may be automatically closed via the solenoid control circuit 334 if the position sensing circuit 326 has detected the sprayer equipment 100 to be in a position that has already been sprayed or if the speed of the sprayer equipment is below a minimum level. In some embodiments, solenoid control circuit 334 may control which of the plurality of spray nozzles 112 are in operation by selectively opening and closing solenoids 124 on various positions of the sprayer equipment 100. For example, if it is detected that one side of the sprayer equipment 100 is covering a paved surface, controller 108 may automatically close the solenoids 124 on that side of the device, using solenoid control circuit 334, to prevent the flow of water and/or chemical from those spray nozzles 112. In still other embodiments, the solenoids 124 may be manually opened or closed via buttons 154 on the user interface 106.

In some embodiments, each spray nozzle 112 includes an outlet sensor 141. The outlet sensor 141 measures, detects, monitors, evaluates, and/or is affected by characteristics (e.g., flow rate) of the water or combined fluid flow through the spray nozzle 112. For example, the outlet sensor 141 is coupled to each spray nozzle 112 proximate to the outlet 140 to detect flow characteristics of fluid out of the spray nozzle 112. The sensed values from the outlet sensor 141 may be communicated to the controller 108 (e.g., pressure regulator control circuit 328, input/output circuit 332) for controlling various components of the sprayer equipment 100.

The sprayer equipment 100 further includes a user interface 106. The user interface 106 acts as an input/output device for operation of the sprayer equipment 100. Thus, the user interface 106 displays various values to the operator and can receive inputs from the selections made by the operator. The user interface 106 includes an on/off switch (e.g., button, toggle) which can be engaged to turn the pump 114 on and off. The user interface 106 can also include a concentrate selection, where an operator can select the type of concentrate to be injected into the sprayer system 110 or from which concentrate tank 122, if there are multiple concentrate tanks 122, the concentrate is injected. In some embodiments, the user interface 106 can also include a turnable knob or dial to adjust the flow rate, for example. Other user interfaces can include keyboards, touch-sensitive screens, buttons, toggles, and the like. The user interface 106 also includes a display which displays various operating values to the operator (e.g., flow rates, pressure, speed, position, concentrate selection, concentrate levels, etc.). In some embodiments, the user interface 106 includes a scanner capable of scanning a barcode. In this way, barcodes on the concentrate tank 122 and/or on the concentrate product itself can be scanned to input the type of concentrate so that the controller 108 can calculate the required concentrate-water ratio for that particular concentrate type. The concentrate type and ratio may in turn be used to control the concentrate injection timing and the amount of concentration per pulse of the injector 118 using the controller 108. In this case, an injector 118 can be integrally formed with each concentrate tank 122 and the injector 118 is sealed, sized, and calibrated specifically for the particular concentrate used. In this way, the operator would not need to adjust or select a proper concentrate-water mix ratio. When the concentrate tank 122 is empty of concentrate, the operator can dispose of the empty tank 122, along with the integrated injector 118. Upon installation of a concentrate tank 122 with an integrated injector 118, the concentrate tank 122 is fluidly coupled to the output fluid flow from the pressure regulator 117 and the injector 118 is electrically connected to the power supply 109 and controller 108 of the sprayer equipment 100.

Figure 14:
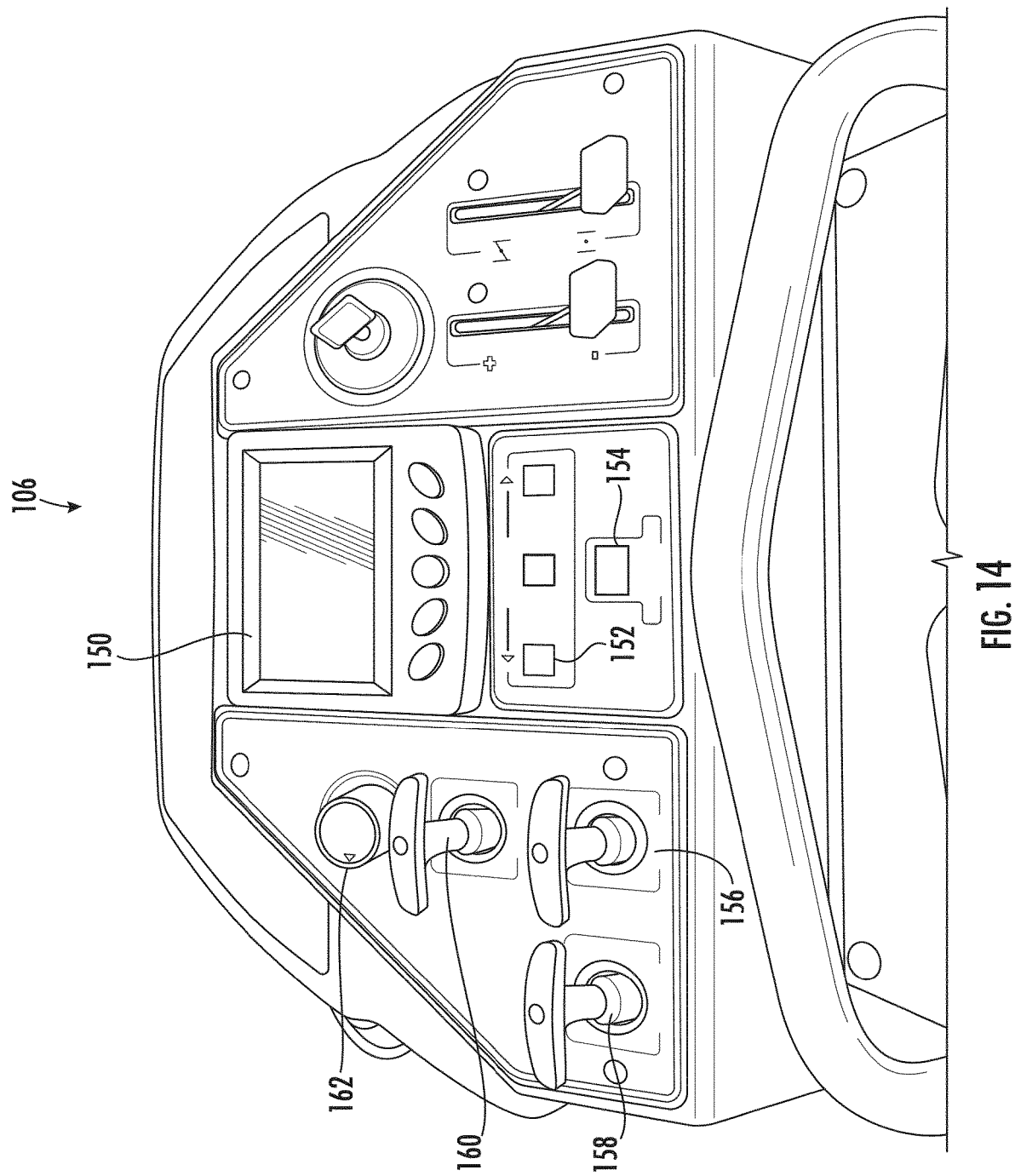
FIG. 14 is a perspective view of a user interface of the sprayer equipment of FIG. 1, according to an exemplary embodiment.

Referring to FIG. 14, one embodiment of user interface 106 is shown, according to an exemplary embodiment. User interface 106 is shown to include a display screen 150, a plurality of nozzle on/off buttons 152, a spray on/off button 154, a hopper gate switch 156, a pattern control switch 158, a trim shield switch 160, and a spinner speed dial/knob 162, among other components. Display screen 150 may include a touch screen and/or a plurality of user inputs, in which a user can manually input specific details about the location, maximum speed, chemical usage, chemical type and other details regarding the sprayer equipment 100. The plurality of nozzle on/off buttons 152 are configured to control the solenoids 124, which in turn may or close the outlet 140, preventing fluid flow through the spray nozzles 112. Using the nozzle on/off button 152, a user may selectively turn on and off the individual spray nozzles 112 to control when and where the sprayer equipment 100 releases the combination of water and chemicals. As seen in FIG. 14, there is a left, right, and center nozzle on/off buttons 152, configured to control the left, right, and center spray nozzles 112 accordingly. In other embodiments, a different number of nozzle on/off buttons 152 may be used. In some embodiments, the user interface 106 may be organized such that the granular controls, i.e. for the hopper 121, are located in one area and the liquid controls, i.e. for the sprayer system 110, are located in a separate area, to provide for ease of use for the user.

The hopper gate switch 156 is configured to allow a user to control the degree as to which a gate of the hopper 121 is opened. The hopper 121 may contain a granular fertilizer or other granular substance to be distributed by sprayer equipment 100. The gate of the hopper 121 may be fully open, partially open, or closed, and may be manually controlled by the user via hopper gate switch 156, to allow a varying degree of granular fertilizer to be distributed. The pattern control switch 158 is configured to allow a user to control the distribution pattern of the granular fertilizer within the hopper 121. The trim shield switch 160 is configured to allow a user to enable a shield to block a certain side or section of the sprayer equipment 100 from distributing granular fertilizer from the hopper 121 to that side. The spinner speed knob 162 is configured to allow a user to manually control a speed of the spinner 125 of the hopper 121, which in turn may affect the amount of granular fertilizer distributed by the sprayer equipment 100 as well as the width and distance of which the spinner 125 is capable of distributing the granular fertilizer to.

Figure 15:
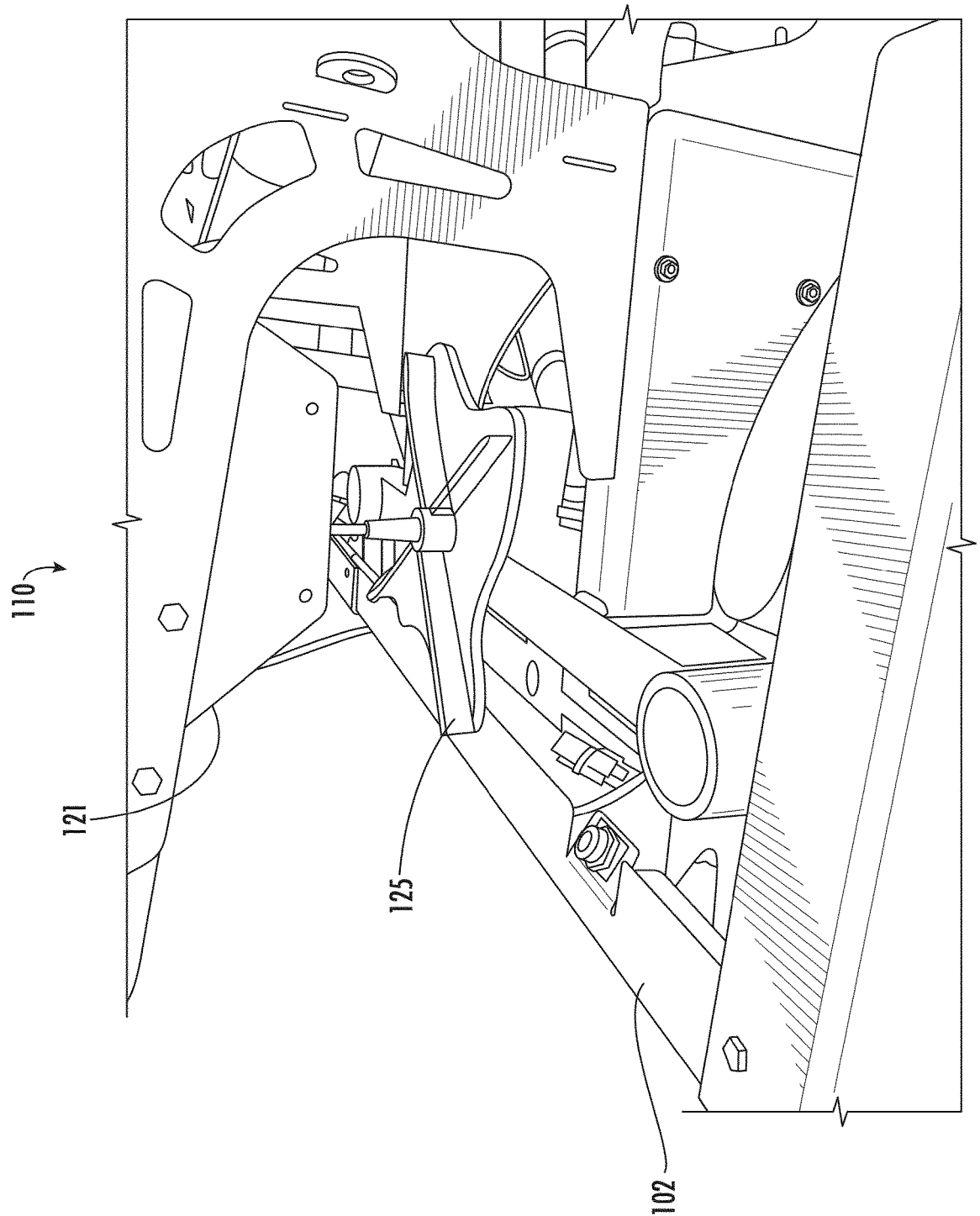
FIG. 15 is a perspective view of the sprayer equipment of FIG. 1, showing a spinner of the hopper, according to an exemplary embodiment.
Figure 16:
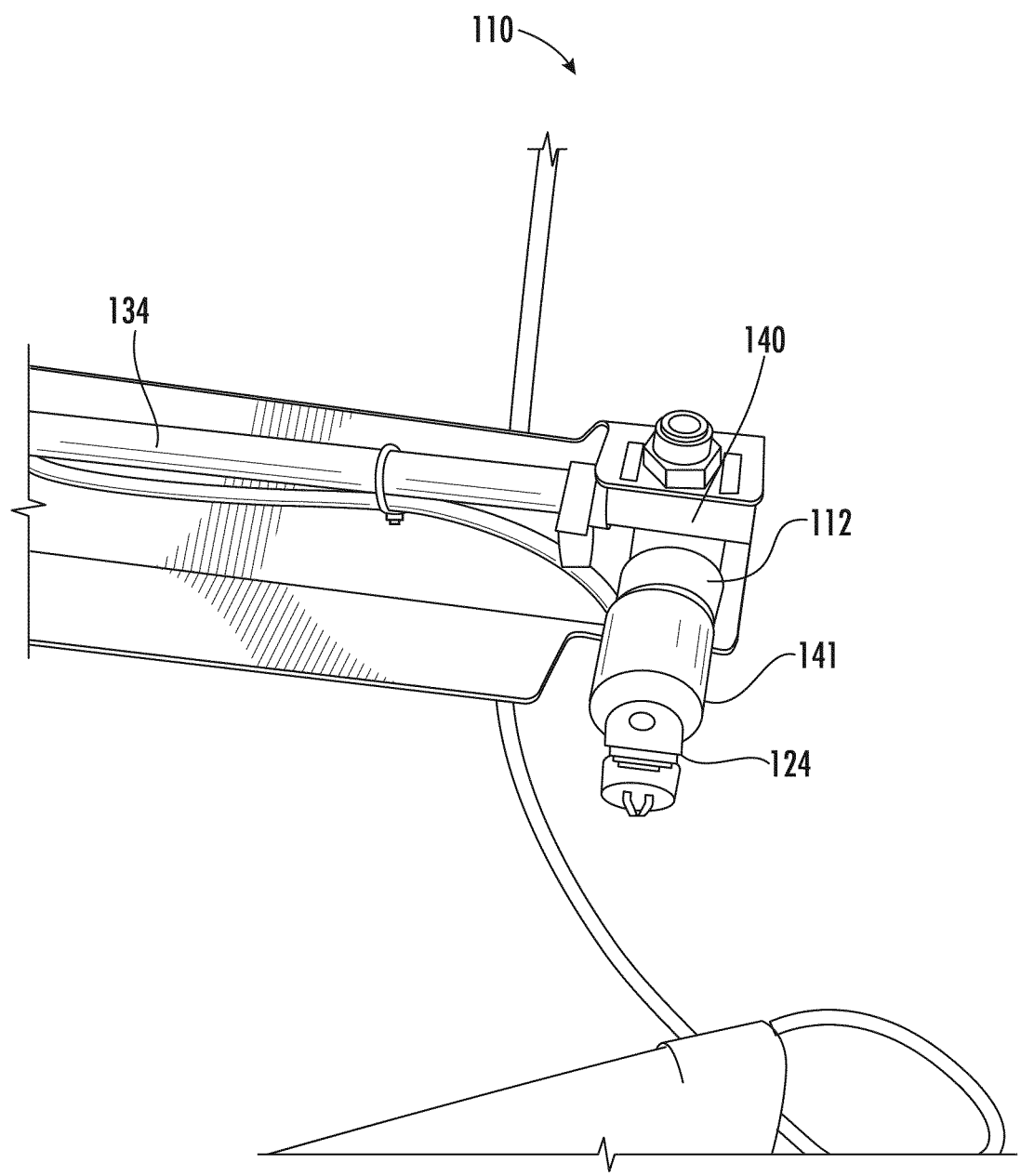
FIG. 16 is a perspective view of a sprayer nozzle of the sprayer equipment, according to an exemplary embodiment.
Figure 17:
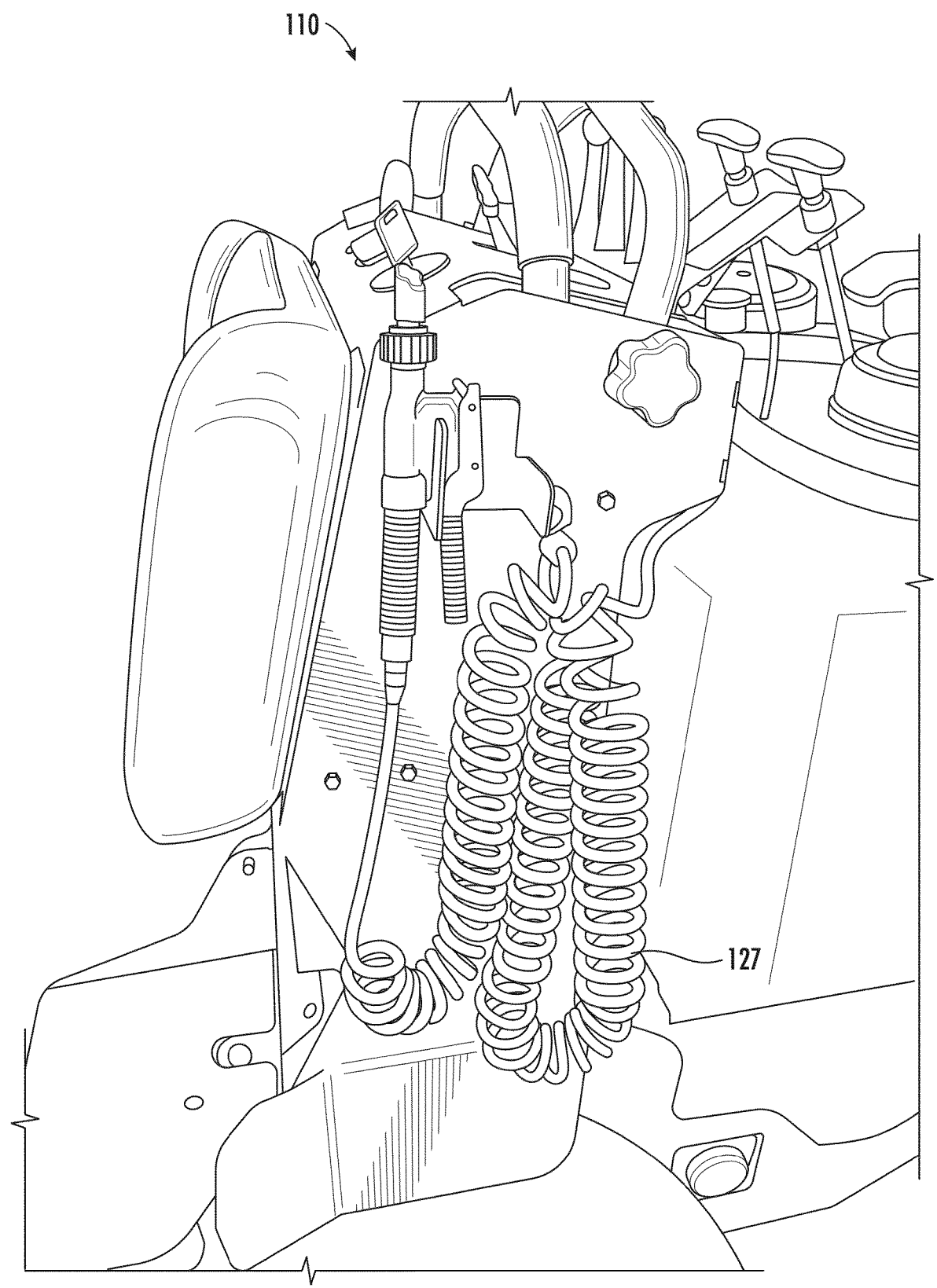
FIG. 17 is a perspective view of a hose of the sprayer equipment of FIG. 1, according to an exemplary embodiment.

Referring to FIG. 15, the spinner 125 of the hopper 121 is shown in greater detail. The spinner 125 is configured to rotate, based on a manual input of spinner speed via the spinner speed knob 162, and to distribute granular fertilizer or another granular substance released from the hopper 121. In some embodiments, the gate of the hopper 121 controls the amount of substance to be released from the hopper 121 to the spinner 125.

Figure 13:
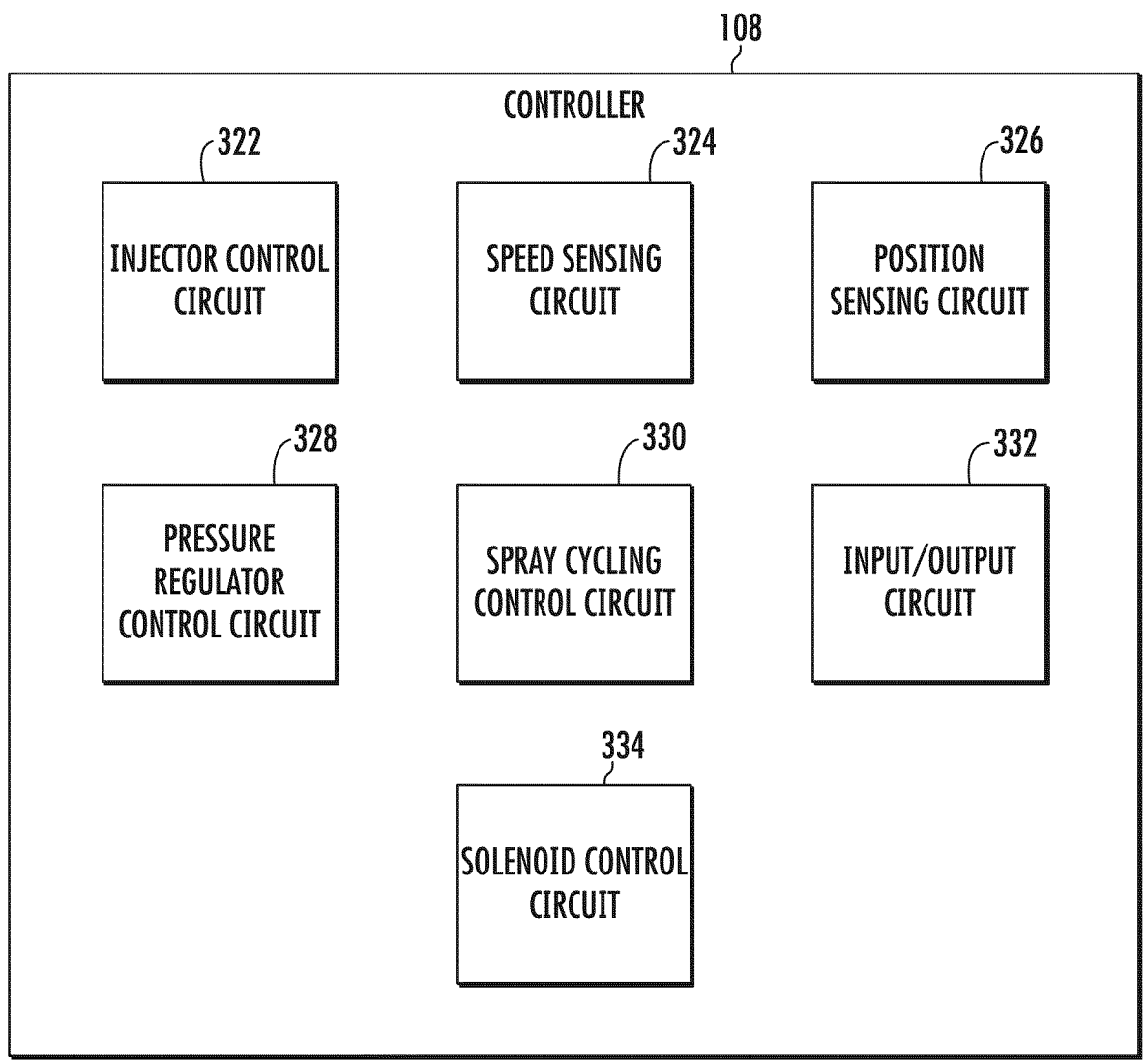
FIG. 13 is a schematic diagram of a controller of the sprayer equipment of FIG. 1, according to an exemplary embodiment.

Referring to FIG. 13, the controller 108 is shown, according to an exemplary embodiment. The controller 108 is configured to control operation of the sprayer equipment 100. In some embodiments, the controller 108 also controls the functionality of the spray nozzles 112. The controller includes a processing circuit having a processor and memory. The processor may be implemented as a general-purpose processor, an application specific integrated circuit (ASIC), one or more field programmable gate arrays (FPGAs), a digital signal processor (DSP), a group of processing components, or other suitable electronic processing components. The memory includes one or more memory devices (e.g., RAM, NVRAM, ROM, Flash Memory, hard disk storage, etc.) that store data and/or computer code for facilitating the various processes described herein. More-over, the memory may be or include tangible, non-transient volatile memory or non-volatile memory.

In some embodiments, the memory may include various databases which retrievably store look-up tables, calculations, and other reference values and control schemes for operating conditions of the sprayer system 110, spray nozzles 112, and user interface 106. These databases may be used in combination with the circuits described herein (e.g., injector control circuit 322, speed sensing circuit 324, etc.) to provide necessary values for control operations of the sprayer equipment 100.

For example, in various embodiments, when the injector 118 receives the appropriate signals from the controller 108, the injector 118 controls the number of injection events to determine the volume of concentrate mixed with the water flow. The injector 118 may also use the received signals from the controller 108 (e.g., from spray cycling control circuit 330) to time concentrate delivery into the water flow path 130. Other aspects of the sprayer equipment 100 may also be controlled, such as the display of the user interface 106. Accordingly, the controller 108 is configured to control various aspects of the sprayer equipment 100.

The controller 108 includes an injector control circuit 322. The injector control circuit 322 is configured to control the timing of each injection event. As such, the injector control circuit 322 is communicably and operatively coupled to each injector 118 to control the timing of the concentrate injection. In this way, the injector control circuit 322 is configured to control the ratio of concentrate to water flowing through the system 110 by controlling the timing of the injection of the concentrate into the water stream. For example, the injector control circuit 322 may control the injector 118 to turn on for a first period of time (e.g., 30 microseconds (μs)) and turn off for a second period of time (e.g., 12,000 μs). In some embodiments, the injector control circuit 322 may control the injector 118 to turn on only when the sprayer equipment 100 has reached a minimum speed, such as 0.25 mph.

[The injector control circuit 322 receives sensed speed values from the speed sensing circuit 324 described below and adjusts the injection timing and amount based on the speed values of the sprayer equipment 100. Depending on the speed of the sprayer equipment 100, it may be desirable to inject more or less concentrate into the water stream, ultimately to be sprayed through the spray nozzles 112. For example, if the sprayer equipment 100 is moving relatively slowly, less concentrate may be injected and if the sprayer equipment 100 is moving relatively fast, more concentrate may be injected into the water stream. When the sprayer equipment 100 is moving slowly, less ground is covered over time. To adequately cover the ground with a concentrate-water mixture, less concentrate is needed. When the sprayer equipment 100 is moving at a fast pace, more ground is covered and thus, to adequately cover the ground with a concentrate-water mixture, more concentrate is needed. In some instances, the controller 108 may shut off the injection of concentrate altogether based on the speed of the sprayer equipment 100. As such, if the sprayer equipment 100 is stopped, the injection of concentrate is shut off. For example, if the speed sensing circuit 324 provides sensed speed values from the sensors 103 on the wheels 104 indicating that the sprayer equipment 100 is performing a turn (e.g., zero-turn) or provides directional values indicating a turn, the controller 108 (e.g., injector control circuit 322, spray cycling control circuit 330) may shut off the injection of concentrate during that time. In cases where the sprayer equipment 100 is equipped with an injector 118 for each spray nozzle 112, the rate of application of concentrate can be adjusted based on the radius of turn of the sprayer equipment 100. For example, the inner spray nozzle 112 (i.e., the nozzle positioned nearest the center of the turn) can be controlled to spray less concentrate than the outer spray nozzles 112 (i.e., the nozzles positioned further from the center of the turn than the inner spray nozzle). In some embodiments, the inner spray nozzle 112 may be turned off entirely by closing the solenoids 124 via the solenoid control circuit 334 during a turn to prevent over spraying of the area.

Accordingly, in some instances, the injector control circuit 322 is configured to shut off one or more injectors 118. In this way, concentrate may not be introduced into the system 110 and only water is sprayed through the spray nozzles 112. This may be done to flush the system of concentrate when switching between concentrate types. In embodiments where multiple injectors 118 are included with the device 100, the injector control circuit 322 is configured to select between the multiple injectors 118, turning all injectors 118 but one off. In some embodiments, the injector control circuit 322 is configured to signal the injectors 118 to inject more than one of the available concentrates to mix two or more concentrates into the water stream.

The injector control circuit 322 may also control the timing of injection based on the sensed values received from the injector sensor 119 at each injector 118 (e.g., output flow of flow rate per pulse of the injector 118). Using the sensed values, the injector control circuit 322 may determine that an injector 118 is becoming clogged or a relatively high or low viscosity of concentrate is being used. In this way, the injector control circuit 322 can adjust the timing of concentrate to accommodate these potential circumstances by sensing actual flow output and comparing the actual flow output to a desired flow output.

In some embodiments, the controller 108 further includes a speed sensing circuit 324. As noted above, the speed sensing circuit 324 is configured to receive sensed values from the speed sensors 103 and communicate the sensed speed values to control injection concentrate type, timing, etc. Thus, the speed sensing circuit 324 is communicably and operatively coupled to the other various control circuits included with the controller 108. In another example, the sensed speed values may be communicated to the input/output circuit 332 for display on the user interface 106. As discussed, the sensed speed values are communicated to the injector control circuit 322 to control injection amount and timing. In some embodiments, speed sensing circuit 324 may detect that a minimum speed of the sprayer equipment 100 has been reached and instruct the injectors 118 to begin injecting concentrate. In other embodiments, speed sensing circuit 324 may selectively open and close solenoids 124 to prevent or allow output from the spray nozzles 112 based on the sensed speed of sprayer equipment 100. Speed sensing circuit 324 may need to detect a speed of at least 0.25 mph or 0.50 mph to begin spraying concentrate, and may stop spraying concentrate once the speed of sprayer equipment 100 drops back below these values. In some embodiments, the speed sensing circuit 324 receives sensed values from the speed sensors 103 for each separate wheel 104, as there is a speed sensor 103 mounted on each wheel 104. Knowing the speed of each individual wheel 104, speed sensing circuit 324 of the controller 108 can determine if the sprayer equipment 100 is turning (e.g. zero-turn) and determine the radius of the turn. Upon detection of a turn, speed sensing circuit 324 can be configured to adjust the rate of application of concentrate based on the radius of turn of the sprayer equipment 100. For example, the inner spray nozzle 112

(i.e., the nozzle positioned nearest the center of the turn) can be controlled to spray less concentrate than the outer spray nozzles 112 (i.e., the nozzles positioned further from the center of the turn than the inner spray nozzle) using the injector control circuit 322 In some embodiments, the inner spray nozzle 112 may be turned off entirely by closing the solenoids 124 via the solenoid control circuit 334 during a turn to prevent over spraying of the area.

In some embodiments, the controller 108 includes a position sensing circuit 326. The position sensing circuit 326 is configured to determine a position of the sprayer equipment 100. The position can be relative to a geo-fenced area that is input into the user interface 106 or can be gathered via a Global Positioning System (GPS). The position sensing circuit 326 communicates with the input/output circuit 332 to display position values on the user interface 106. Accordingly, the position sensing circuit 326 is communicably and operatively coupled to the input/output circuit 332. For example, a map of the job area may be reproduced on the user interface 106, and "complete" and "incomplete" portions of the map may show which areas the sprayer equipment 100 has sprayed and which areas have not been sprayed. The position sensing circuit 326 can therefore be used to prevent overlap and over-application of a concentrate on the ground. In some embodiments, if the position sensing circuit 326 detects that sprayer equipment 100 is covering an area which has already been sprayed, position sensing circuit 326 may communicate with solenoid control circuit 334 to close solenoids 124 and prevent sprayer equipment 100 from overlapping the concentrate on the ground.

In some embodiments, the controller 108 includes a pressure regulator control circuit 328. The pressure regulator control circuit 328 receives flow property values (e.g., pressure, flow rate) from the pressure regulator 116 and adjusts various components of the system 110 in accordance with desired flow properties. In this regard, the pressure regulator control circuit 328 is communicably and operatively coupled to the pressure regulator 116. The pressure regulator control circuit 328 may control the pressure regulator 116 to affect the amount of concentrate injected into the system 110. In addition, the pressure regulator control circuit 328 may also control the flow rate and pressure properties of the system 110 by controlling the pressure regulator 116.

In some embodiments, the controller 108 includes a spray cycling control circuit 330. The spray cycling control circuit 330 is configured to signal the performance of cleaning and/or flushing cycles of the system 110. For example, the central concentrate conduit 136 (or concentrate conduits 134) between the concentrate tank 122 and the injector 118 may need to be cleaned or flushed routinely. As another example, the spray nozzles 112 and injector 118 may need to be flushed between switches of the type of concentrate injected into the system 110. In these instances, the spray cycling control circuit 330 signals the injector 118 to shut off and the system 110 to operate with only water for a period of time. Thus, the spray cycling control circuit 330 is communicably and operatively coupled to the injector 118.

In some embodiments, the controller 108 also includes an input/output circuit 332. The input/output circuit 332 is configured to generate and transmit various display messages to the user interface 106 for display and to receive inputs from the user interface 106. Thus, the input/output circuit 332 is communicably and operatively coupled to the user interface 106 to display received values from various components of the sprayer equipment 100 and receive values from the user interface 106. The input/output circuit 332 is also communicably coupled with the other circuits of the controller 108 (e.g., injector control circuit 322, speed sensing circuit 324, position sensing circuit 326, pressure regulator control circuit 328, and spray cycling control circuit 330) to receive specific values of components of the sprayer equipment 100 for display. For example, the input/output circuit 332 can receive values from the pressure regulator control circuit 328 regarding flow properties of the system 110 and can receive values from the speed sensing circuit 324 to display the speed of the device 100.

The input/output circuit 332 may further be configured to receive an input from the user relating to what chemical is in the concentrate tank 122. A user may select, using display screen 150, a chemical type. The input/output circuit 332 may search a database that is a component of the controller 108 to select the corresponding chemical distribution volumetric rate for the selected chemical. In other embodiments, this database is not a component of the controller 108 (e.g., the database is stored in the cloud and the controller 108 accesses the database via a wireless connection). In some embodiments, the chemical distribution volumetric rate may be displayed on the display screen 150 for the user to see. The chemical distribution volumetric rate may be presented in ounces of chemical to be distributed per square feet covered by the sprayer equipment 100. In some embodiments, the chemical distribution volumetric rate may be around 5 oz./1000 sq. ft. The input/output circuit 332 may further be configured to receive an input from the user relating to what granular fertilizer or other granular substance is filled in the hopper 121. The input/output circuit may search a database to select the corresponding fertilizer distribution rate for the selected fertilizer.

In some embodiments, the controller 108 also includes a solenoid control circuit 334. The solenoid control circuit 334 may be used to selectively open and close the solenoids 124 to allow or prevent fluid to flow from the spray nozzles 112. In some embodiments, solenoid control circuit 334 will turn on solenoids 124 to all spray nozzles 112 to activate only once a minimum speed of the sprayer equipment 100 has been reached, or if the position sensing circuit 326 has detected a correct position of the sprayer equipment 100.

Controller 108 may be configured to operate the sprayer equipment 100 at the chemical distribution volumetric rate of the selected chemical. Using the speed sensing circuit 324, the controller 108 monitors the speed of the sprayer equipment 100. Using the pressure regulator control circuit 328, the controller 108 is able to determine flow rate of the water and/or chemicals being supplied to spray nozzles 112. In some embodiments, the flow rate may be determined directly by the pressure regulator control circuit 328 via the flow sensor 117. In other embodiments, the flow rate may be determined indirectly by a pressure sensor of the pressure regulator control circuit 328 in combination with various details of the sprayer system 110, such as the type of spray nozzle 112 used. The controller 108 may also be programmed or have stored in a memory the capabilities of the injector 118, such as the volume of chemical delivered per stroke of the piston 290 of the injector 118 and the speed of said strokes, e.g. how many strokes of the piston 290 occur in a set time period, and therefore overall volume of water and/or chemical delivered by the injector over a set time period. The controller 108 can therefore automatically control the injection of water and/or chemical to deliver the desired chemical distribution volumetric rate utilizing the speed of the sprayer equipment 100, the flow rate of water and/or chemical delivered to spray nozzles 112, and the capabilities of the injector 118. The controller 108 can adjust and update the injection, using the injector control circuit 322 and/or the solenoid control circuit 334 to selectively close spray nozzles 112, in real time. When in use, the sprayer equipment 100 may have a variable speed, and the controller 108 may consistently update and modify the injection of water and/or chemical, to maintain the desired chemical distribution volumetric rate. In the present embodiment, the user does not have to select or vary the rate of chemical distribution, which eliminates user error from the chemical distribution process. Additionally, there is no chemical mixing necessary, as the chemical is automatically distributed at the desired rate based on the speed of the sprayer equipment 100. Sprayer equipment 100 will automatically distribute the desired amount of water and/or chemical based on the selected chemical and the speed of the sprayer equipment 100. In some embodiments, controller 108 may further utilize the speed of the sprayer equipment 100, determined by speed sensing circuit 324, to automatically control hopper 121 to distribute the fertilizer at the desired fertilizer distribution rate. Controller 108 may be configured to open and close the gate of the hopper 121 and modify the speed of the spinner 125 in order to distribute the fertilizer at the desired fertilizer distribution rate.

In some embodiments, the sprayer equipment 100 is used in a fleet management scenario. In this case, the sprayer equipment 100 may act as a connected unit in a fleet of sprayer units. The device 100 may therefore be connected to a central computing system configured to track and manage various sprayer units. The computing system can be used to schedule fertilizer and/or chemical spreading or spraying operations, routing of connected units, arrival and departure times of the units from jobsites, and alerts of operation and/or location of the sprayer units. The system can further monitor the amount (e.g., weight or volume) of concentrate or chemical in the connected sprayer units prior to and during completion of a job for billing purposes (e.g., the concentrate start weight subtracted by the end weight is used to determine the amount of concentrate used). In addition, the system can track the route of spraying or spreading operations and the width of affected area during spraying. The tracked route and width of application can then be provided in the form of a map. In spraying applications, the system monitors the rate at which concentrate or chemical is applied and compares the rate of application to the speed of travel of the unit. This comparison can be used to control the application rate of concentrate to provide consistent and accurate coverage. The sensors that may be included with units completing a concentrate spraying application can include, but are not limited to, a speed sensor, location positioning sensor, accelerometer, hopper and/or tank scales, sprayer/spreader on/off sensor, and revolutions per minute sensor on spinners. The system can further provide guidance to an operator within the cab of a connected unit such that any overlap of coverage may be prevented or managed (e.g., via a position sensor). The system can further provide and/or store records of chemical application (e.g., for each jobsite, types of chemicals, amount of chemical sprayer/spread, date of application, etc.).

As utilized herein, the terms "approximately," "about," "proximate," "substantially," and similar terms are intended to have a broad meaning in harmony with the common and accepted usage by those of ordinary skill in the art to which the subject matter of this disclosure pertains. These terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The term "exemplary" as used herein to describe various embodiments is intended to indicate that such embodiments are possible examples, representations, and/or illustrations of possible embodiments.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another as separate bodies.

References herein to the positions of elements (e.g., "top," "bottom," "above," "below," etc.) are merely used to describe the orientation of various elements in the accompanying drawings. The orientation of various elements may differ according to other exemplary embodiments, and that such variations are intended to be encompassed by the present disclosure.

The construction and arrangement of the spray system as shown in the various exemplary embodiments is illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

What is claimed is:

1. A sprayer equipment, comprising:
   a support frame having a plurality of wheels;
   a hopper coupled to the support frame and configured to receive and store a granular substance, the hopper including a spinner configured to distribute the granular substance of the hopper;
   a pump coupled to the support frame and including a pump inlet configured to be fluidly coupled to a water source and a pump outlet providing water at an increased water pressure;
   a pressure regulator configured to control the pressure of the water;
   a concentrate tank supported by the support frame and configured to store a concentrate fluid;
   an injector fluidly coupled to the concentrate tank and configured to inject the concentrate fluid into the water downstream of the pressure regulator resulting in a combined fluid;
   a spray nozzle fluidly coupled to the pump outlet and the injector, the spray nozzle configured to spray the water or combined fluid; and
   a controller coupled to the injector and the spinner and including a speed sensing circuit configured to determine a speed value of the sprayer equipment, the controller configured to control operation of the injector and the spinner,
   wherein the controller is configured to only turn the injector on when the sprayer equipment has reached a minimum speed value and is configured to turn the injector off when the sprayer equipment is under the minimum speed value, and wherein the minimum speed value is greater than 0 miles per hour (mph).

2. The sprayer equipment of claim 1, wherein the spray nozzle is one of a plurality of spray nozzles, wherein each of the plurality of spray nozzles comprises a solenoid fluidly coupled to the spray nozzles, and wherein the solenoids are configured to selectively open and close the plurality of spray nozzles.

3. The sprayer equipment of claim 1, further comprising a flow sensor fluidly coupled to the pump outlet;
   wherein the controller controls a timing of injection of the concentrate fluid into the water based on a sensed flow output from the flow sensor.

4. The sprayer equipment of claim 3, wherein the controller controls the timing of injection of the concentrate fluid based on a pressure set by the pressure regulator.

5. The sprayer equipment of claim 1, further comprising an injector sensor coupled to the injector downstream of an injector outlet;
   wherein the controller controls a timing of injection of the concentrate fluid based on a sensed output flow from the injector.

6. The sprayer equipment of claim 1, further comprising a user interface configured to receive one or more inputs from a user, the one or more inputs comprising a selected concentrate.

7. The sprayer equipment of claim 6, further comprising a database which the controller is configured to search to determine a desired distribution rate of the selected concentrate.

8. The sprayer equipment of claim 7, wherein the controller controls a timing of injection of the concentrate fluid into the water based on the speed value and the desired distribution rate of the selected concentrate.

9. The sprayer equipment of claim 8, wherein when the speed value is below a predetermined speed value, the controller signals the injector to control a duration of injection of the concentrate fluid below a duration threshold.

10. The sprayer equipment of claim 8, wherein when the speed value is above a predetermined speed value, the injector control circuit signals the injector to control the duration of injection of the concentrate fluid above a duration threshold.

11. The sprayer equipment of claim 1, wherein the controller is configured to shut off the injector to prevent injection of the concentrate fluid to perform a flushing sequence.

12. A spraying system, comprising:
a user interface configured to receive one or more inputs from a user, the one or more inputs comprising a selected concentrate;
a pump including a pump inlet configured to be fluidly coupled to a water source and a pump outlet providing water at an increased water pressure;
a pressure regulator configured to control the pressure of the water;
a concentrate tank configured to store a concentrate fluid;
an injector fluidly coupled to the concentrate tank configured to inject the concentrate fluid into the water downstream of the pressure regulator resulting in a combined fluid;
a spray nozzle fluidly coupled to the pump outlet and the injector, the spray nozzle configured to spray the combined fluid; and
a controller coupled to the injector and the user interface, the controller including a database and a speed sensing circuit configured to determine a speed value of the spraying system,
wherein the controller is configured to receive the selected concentrate and search the database to determine a desired distribution rate of the selected concentrate, and wherein the controller is configured to control operation of the injector by controlling a timing of injection of the concentrate fluid into the water based on the desired distribution rate of the selected concentrate and the speed value, wherein the controller is configured to only turn the injector on when the spraying system has reached a minimum speed value and is configured to turn the injector off when the spraying system is under the minimum speed valve, and wherein the minimum speed value is greater than 0 miles per hour (mph).

13. The spraying system of claim 12, wherein the spray nozzle is one of a plurality of spray nozzles, wherein each of the plurality of spray nozzles comprises a solenoid fluidly coupled to the spray nozzles, and wherein the solenoids are configured to selectively open and close the plurality of spray nozzles.

14. The spraying system of claim 12, further comprising a flow sensor fluidly coupled to the pump outlet;
wherein the controller controls the timing of injection of the concentrate fluid into the water based on a sensed flow output from the flow sensor.

15. The spraying system of claim 14, wherein the controller controls the timing of injection of the concentrate fluid based on a pressure set by the pressure regulator.

16. The spraying system of claim 12, further comprising an injector sensor coupled to the injector downstream of an injector outlet;
wherein the controller controls the timing of injection of the concentrate fluid based on a sensed output flow from the injector.

17. The spraying equipment of claim 1, wherein the hopper further includes a hopper gate movable between an open positon and a closed positon, and wherein the controller is further coupled to the hopper gate and configured to selectively control movement of the hopper gate without user input.

18. The spraying equipment of claim 1, wherein the inputs further comprise a desired distribution rate of the granular substance, and wherein the controller controls a speed of the spinner based on the desired distribution rate of the granular substance and the speed value.

19. The spraying system of claim 12, wherein the one or more inputs are received via a barcode scanned by the user interface.

20. The spraying equipment of claim 1, wherein the minimum speed value is approximately 0.25 mph.

21. The spraying system of claim 1, wherein the minimum speed value is approximately 0.25 mph.

* * * * *